US012225369B2

(12) United States Patent
Scheuregger et al.

(10) Patent No.: US 12,225,369 B2
(45) Date of Patent: Feb. 11, 2025

(54) ADAPTIVE SOUND IMAGE WIDTH ENHANCEMENT

(71) Applicant: Bang & Olufsen A/S, Struer (DK)

(72) Inventors: Oliver Scheuregger, Valby (DK); Lyle Bruce Clarke, Lunderskov (DK)

(73) Assignee: Bang & Olufsen A/S, Struer (DK)

( * ) Notice: Subject to any disclaimer, the term of this patent is extended or adjusted under 35 U.S.C. 154(b) by 140 days.

(21) Appl. No.: 18/054,652

(22) Filed: Nov. 11, 2022

(65) Prior Publication Data

US 2024/0163626 A1 May 16, 2024

(51) Int. Cl.
*H04S 7/00* (2006.01)

(52) U.S. Cl.
CPC .......... *H04S 7/302* (2013.01); *H04S 2400/01* (2013.01)

(58) Field of Classification Search
None
See application file for complete search history.

(56) References Cited

U.S. PATENT DOCUMENTS 6,144,747 A 11/2000 Scofield et al.
10,251,012 B2 4/2019 Schaefer
2015/0125010 A1 5/2015 Yang et al.
2017/0272881 A1 9/2017 Geiger et al.
2019/0166447 A1* 5/2019 Seldess .................. H04S 7/303
2022/0014866 A1* 1/2022 Vesa ...................... H04S 7/302
2022/0030375 A1 1/2022 Falk et al.

OTHER PUBLICATIONS

"10 Things you need to know about Next Generation Audio," EBU Operating Eurovision and Euroradio, Date Accessed: Feb. 10, 2023, pp. 1-30.
Peter, "What is . . . Higher Order Ambisonics?" SSA Plugins, Dated: Jul. 18, 2017, pp. 1-7.
European Patent Office, Extended European Search Report for European Patent Application No. 23208869.0, dated Mar. 12, 2024.

* cited by examiner

*Primary Examiner* — Kenny H Truong
(74) *Attorney, Agent, or Firm* — Patterson + Sheridan, LLP

(57) ABSTRACT

The disclosure provides an approach for adaptive sound image width enhancement. A method of adaptively correcting sound image width is provided. The method includes obtaining an audio signal. The audio signal is associated with one or more audio channels. Each audio channel is associated with a position of an audio source with respect to a reference point within a local reproduction system. The method includes decomposing the audio signal into mid signal, side signal, and unprocessed signal components. The method includes applying respective correction gains to each of the mid signal, side signal, and unprocessed signal components. The respective correction gains are based on a physical distance between a first loudspeaker and a second loudspeaker within the local reproduction system. The method includes rendering, after applying the respective correction gains, the mid signal, side signal, and unprocessed signal components to the first and second loudspeakers.

20 Claims, 13 Drawing Sheets

ADAPTIVE SOUND IMAGE WIDTH ENHANCEMENT

INTRODUCTION

Field of the Disclosure

The present disclosure is related to sound reproduction systems and, more specifically, to reproduction and control of sound fields with adaptive sound image width enhancement.

BACKGROUND

Stereophonic sound, more commonly known as "stereo", is a method of sound reproduction that uses at least two independent audio channels, through a configuration of at least two loudspeakers (or alternatively, a pair of two-channel headphones), to create a multi-directional and three-dimensional audio perspective that provides an audio experience to the listener that creates the impression of sound heard from various directions, as in natural hearing.

Surround sound refers to stereo systems using more than two audio channels, more than two loudspeakers, or both, to enrich the depth and fidelity of the sound reproduction. Stereo sound can be captured as live sound (e.g., using an array of microphones), with natural reverberations present, and then reproduced over multiple loudspeakers to recreate, as close as possible, the live sound. Pan stereo refers to a single-channel (mono) sound that is then reproduced over multiple loudspeakers. By varying the relative amplitude of the signal sent to each speaker, an artificial direction (relative to the listener) can be created.

One type of stereo audio is referred to as mid/side (M/S). A bidirectional microphone (e.g., with a figure eight pattern) facing sideways and a cardioid facing the sound source can be used to record mid/side audio. The "left" and "right" audio channels are encoded through a simple matrix: Left:=Mid+Side and Right=Mid−Side, where "minus" means adding the side signal with the polarity reversed. The stereo width, and thereby the perceived distance of the sound source, can be manipulated after the recording.

Panning algorithms are capable of redistributing audio signals across a given array of transducers. Panning algorithms are used in both the creation of audio content (e.g., a studio mixing desk will typically have stereo pan-pots to position an audio signal across the left-right dimension), as well as in the rendering of audio (e.g., in consumer loudspeaker setups). Examples of panning algorithms include, but are not limited to, Vector Base Amplitude Panning (VBAP), Ambisonic panning (e.g., Ambisonic Equivalent Panning (AEP)), Distance Base Angular Panning (DBAP), Layer Base Amplitude Panning (LBAP), Dual Band Vector Base Panning (VBP Dual-Band), K-Nearest Neighbor (KNN) panning, Speaker-Placement Correction Amplitude (SPCAP) panning, Continuous Surround Panning (CSP), Angular and PanR panning.

In today's media-driven society, there are increasingly more ways for users to access video and audio, with a plethora of products producing sound in the home, car, or almost any other environment. Portable products producing audio, such as, for example, phones, tablets, laptops, headphones, portable loudspeakers, soundbars, and many other devices, are ubiquitous. These products for producing sounds may include, for example, a large variety of audio such as music, speech, podcasts, sound effects, and audio associated with video content.

Next Generation Audio (NGA) refers to developments in technologies that strive to create audio systems which are immersive, providing a user an enhanced immersive auditory experience; adaptive, capable of adapting to different acoustic environments, different listener/speaker locations, and different listening contexts; and interactive, allowing users to make conscious decisions to interact with the system such that the auditory experience is modified in a way that is intuitive and expected by the user. NGA technologies include, for example, rendering technologies, focused on digital processing of audio signals to improve the acoustic experience of the listener; user interaction technologies, focused on mapping user-driven actions to changes in the auditory experience; and experiential technologies, focused on using technology to deliver new auditory experiences.

One NGA technology is Object-Based Audio, which consists of audio content together with metadata that tells the receiver device how to handle the audio. For example, in a traditional audio production process, many audio sources (e.g., microphones) are used to capture sound, and the audio sources can then be mixed down to a fewer number of channels which represent the final speaker layout, referred to as "downmixing". For example, a hundred (100) microphones may be used to capture the sound played by an orchestra and then mixed down to two audio channels-one for "left" and one for "right" (to be reproduced by two loudspeakers in a stereo system). With Object-Based Audio, the sound sources can be grouped, or isolated, into audio feeds that constitute separate, logical audio objects. For example, the different audio feeds might correspond to different individual voices or instruments, different sound effects (e.g., like a passing vehicle). An audio feed for a group of microphones can make up a logical entity (e.g., a string section or a drum kit). Each feed is distributed as a separate object made of the audio and the metadata containing descriptive data describing the audio, such as the audio's spatial position, the audio level, and the like. The metadata can be modified by a user, allowing the user to control how that audio stream is reproduced.

Another example of NGA technology is Immersive Audio, which augments horizontal surround sound with the vertical dimension (i.e., height). Immersive audio formats may be encoded as either channel-based systems or sound-scene-based systems. In the case of channel-based systems, a number of audio channels contain the audio signals, where each channel is assigned to a discrete physical loudspeaker in the reproduction setup. This is identical to how "non-immersive" channel-based audio formats (e.g., stereo, 5.1) are represented, the only difference being the number of channels available and the number of physical loudspeakers able to reproduce the sound field. Examples include 22.2 and 10.2 systems, as described in the ITU-R BS 0.2159-9.

Soundscene-based audio formats encode an acoustic sound field which can later be decoded to a specified loudspeaker array and/or headphone format. One sound-scene-based method is Ambisonics, which encodes a sound field above and below the listener in addition to in the horizontal plane (e.g., front, back, left, and right). Ambisonics can be understood as a three-dimensional extension of mid/side stereo that adds additional channels for height and depth. Ambisonics is a technique storing and reproducing a sound field at a particular point with spatial accuracy. The degree of accuracy to which the sound field can be reproduced depends on multiple factors, such as the number of loudspeakers available at the reproduction stage, how much storage space is available, computing power, download/ transmission limits, etc. Ambisonics involves encoding a sound field to create a set of signals, referred to as audio channels, that depends on the position of the sound, with the audio channels weighted (e.g., with different gains) depending on the position of the sound source. A decoder then decodes the audio channels to reproduce the sound field. Loudspeaker signals can be derived using a linear combination of the Ambisonic component signals.

As discussed in more detail herein, loudspeakers may be incorrectly positioned. As used herein, loudspeaker incorrect positioning refers to loudspeaker positioning that generates an inaccurate or degraded sound image. In some examples, incorrect loudspeaker positioning may occur when the loudspeakers are positioned according to a non-standardized positioning, such as a loudspeaker placement that does not conform to the ITU-R recommended positioning (e.g., such as those specified in ITU-R 775). It is common in domestic setups that the user neglects (intentionally or unintentionally) to correctly calibrate and arrange the loudspeakers according to the relevant standards. For example, the loudspeakers may be placed either too close together or too far apart.

When the loudspeakers are too far apart, the user perceives a wider sound stage. When the loudspeakers are too close together, the user perceives a narrower sound stage. When the physical distance between the loudspeakers becomes great enough or small enough, the sound image collapses resulting in a degraded sound stage perceived by the user, which leads to a poor listening experience for the user. The loudspeaker incorrect positioning can further lead to undesired artefacts in the sound image, such as comb-filtering (in which some of the frequencies overlap and interfere with each other) which affects the timbre of the sound. Other environmental factors, such as the geometry and/or acoustics of the user's home may further impair reproduction fidelity.

Accordingly, techniques for improving the user experience provided by incorrectly positioned loudspeakers are needed.

SUMMARY

The technology described herein provides a method of adaptive sound image width enhancement.

A method of adaptively correcting sound image width is provided. The method includes obtaining an audio signal. The audio signal is associated with one or more audio channels. Each audio channel is associated with a position of an audio source with respect to a reference point within a local reproduction system. The method includes decomposing the audio signal into a mid signal component, a side signal component, and an unprocessed signal component. The method includes applying respective correction gains to each of the mid signal component, side signal component, and unprocessed signal component. The respective correction gains are based on a physical distance between a first loudspeaker and a second loudspeaker within the local reproduction system. The method includes rendering, after applying the respective correction gains, the mid signal component, the side signal component, and the unprocessed signal component to the first loudspeaker and the second loudspeaker.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
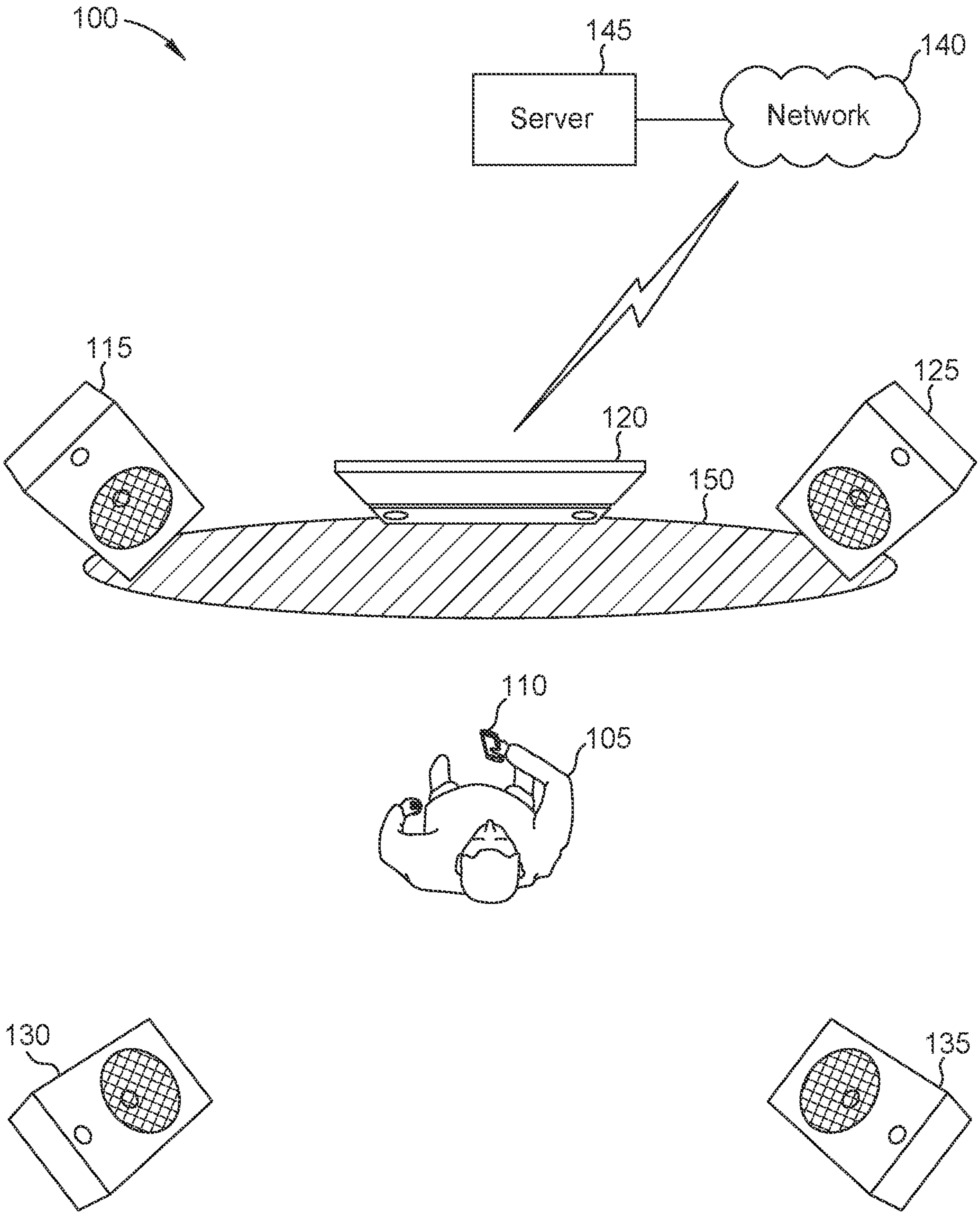
FIG. 1 depicts a diagram of an example multimedia system and sound field, according to one or more aspects.

The present disclosure provides an approach for adaptive sound image width enhancement (ASWE).

In some aspects, the sound image width is adaptively enhanced when incorrect loudspeaker positioning is detected, such as when the system determines the physical distance between two loudspeakers is smaller or larger than a target distance. In some aspects, however, when the physical distance between the two loudspeakers is larger than a threshold distance or smaller than a threshold distance, the adaptive sound image width enhancement is bypassed (e.g., not performed).

In some aspects, to perform the adaptive sound image width enhancement, an input audio signal is decomposed into a mid signal component, a side signal component, and an unprocessed signal component. Corrective gains are then be applied to each of the mid, side, and unprocessed signal components to compensate for the incorrect loudspeaker positioning, such as to generate the target sound image width, as though the loudspeakers were correctly positioned.

In some aspects, one or more mapping functions, look-up tables, or other mappings are used to determine the respective corrective gains for the mid, side, and unprocessed signal components based on the physical distance between the loudspeakers. In some aspects, boundary conditions are applied, defining minimum and maximum gains for each of the mid, side, and unprocessed signal components, which may correspond to the respective corrective gains to be applied at the minimum or maximum threshold loudspeaker separation distances. For loudspeaker separation distances between the minimum and maximum threshold loudspeaker separation distances, the respective corrective gains may increase or decrease linearly or exponentially (e.g., based on an exponent parameter) between the respective minimum and maximum corrective gains.

In some aspects, the adaptive sound image width enhancement is performed before or after upmixing or downmixing is performed. The adaptive sound image width enhancement may be performed independently for each audio channel, and may use the same or different parameters for each audio channel.

In some aspects, an additional compensation gain is applied, such that the energy of the system remains unchanged before and after applying the corrective gains.

In some aspects, the corrective gains are further based on additional detected acoustic parameters of the room.

It should be understood that while aspects are described herein for ASWE with stereo input, the aspects can be performed on different types of audio signals. For example, with 5.1 surround input, the front L/R channels and the surroundL and surroundR and can be treated as two pairs of channels and the ASWE can be performed separately for each of the pairs. In another example, with object based audio, the audio stream and metadata can be decomposed into various combinations of audio objects, and respective corrective gains for those different combinations can be mapped to loudspeaker separation distances.

Example System with Adaptive Sound Image Width Enhancement

Aspects of the disclosure for adaptive sound image width enhancement may be performed in when a user is consuming audio content. In some cases, a user consumes both audio content and associated visual content. Audio-visual content may be provided a multimedia system. While aspects of the disclosure are described with respect to a multimedia system, it should be understood that the aspects described herein equally apply to any local reproduction setup.

FIG. 1 depicts example multimedia system 100 in which aspects of the present disclosure may be implemented. Multimedia system 100 may be located in any environment, such as a home, such as in a living room, home theater, yard, or other room, in a vehicle, in an indoor or outdoor venue, or any other suitable location.

An audio-visual multimedia system includes a visual display and acoustic transducers. Multimedia installations typically include a display screen, loudspeakers, and a control unit for providing input to the display screen and to the loudspeakers. The input may be a signal from a television provider, a radio provider, a gaming console, various Internet streaming platforms, and the like. It should be understood that other components may also be included in a multimedia installation.

Both audio and visual systems have the option to be tethered, or not, to the user. As used herein, "tethered" refers to whether the audio-visual content moves relative to the user when the user moves. For example, headphones worn by a user which do not apply dynamic head-tracking processing provide a "tethered" audio system, where the audio does not change relative to the user. As the user moves about, the user continues to experience the audio in the same way. On the other hand, loudspeakers placed in a room are "untethered" and do not move with the user. Similarly, a pair of headphones which employ dynamic head-tracked binaural rendering would be considered a form of "untethered", albeit one that is simulated. Thus, as the user moves about, the user may experience the audio content differently. Similarly, a television mounted to a wall is an example of an untethered visual system, whereas a screen (e.g., a tablet or phone) held by the user is an example of a tethered visual system. A virtual reality (VR) headset may provide a form of simulated "untethered" video content, in which the user experiences the video content differently as the user moves about. It should be understood that these examples are merely illustrative, and other devices may provide tethered and untethered audio and visual content to a user.

As shown, multimedia system 100 may include loudspeakers 115, 120, 125, 130, and 135. Loudspeakers 115, 120, 125, 130, and 135 may be any electroacoustic transducer device capable of converting an electrical audio signal into a corresponding sound. Loudspeakers 115, 120, 125, 130, and 135 may include one or more speaker drivers, subwoofers drivers, woofer drivers, mid-range drivers, tweeter drivers, coaxial drivers, and amplifiers which may be mounted in a speaker enclosure. Loudspeakers 115, 120, 125, 130, and 135 may be wired or wireless. Loudspeakers 115, 120, 125, 130, and 135 may be installed in fixed positions or moveable. Loudspeakers 115, 120, 125, 130, and 135 may be any type of speakers, such as surround-sound speakers, satellite speakers, tower or floor-standing speakers, bookshelf speakers, sound bars, TV speakers, in-wall speakers, smart speakers, portable speakers. It should be understood that while five loudspeakers are shown in FIG. 1, multimedia system 100 may include fewer or greater number of loudspeakers which may be positioned in multiple different configurations, as discussed in more detail below with respect to FIG. 2.

Multimedia system 100 may include one or more video displays. For example, a video display may be a user device 110, such as a smartphone or tablet as shown in FIG. 1. It should be understood that a video display may be any type of video display device, such as a TV, a computer monitor, a smart phone, a laptop, a projector, a VR headset, or other video display device.

Although not shown in FIG. 1, multimedia system 100 may include an input controller. The input controller may be configured to receive an audio/visual signal and provide the visual content to a display (e.g., user device 110 or TV with integrated loudspeaker 120) and audio content to the loudspeakers 115, 120, 125, 130, and 135. In some systems, separate input controllers may be used for the visual and for the audio. In some systems, the input controller may be integrated in one or more of the loudspeakers 115, 120, 125, 130, and 135 or integrated in the display device. In some systems, the input controller may be a separate device, such as a set top box (e.g., an audio/video receiver device).

In some aspects, one or more components of the multimedia system 100 may have wired or wireless connections between them. Wireless connections between components of the multimedia system 100 may be provided via a short-range wireless communication technology, such as Bluetooth, WiFi, ZigBee, ultra wideband (UWB), or infrared. Wired connections between components of the multimedia system 100 may be via auxiliary audio cable, universal serial bus (USB), high-definition multimedia interface (HDMI), video graphics array (VGA), or any other suitable wired connection.

In addition, multimedia system 100 may have a wired or wireless connection to an outside network 140, such as a wide area network (WAN). Multimedia system 100 may connect to the Internet via an Ethernet cable, WiFi, cellular, broadband, or other connection to a network. In some aspects, network 140 further connects to a server 145. In some aspects, the input controller may be integrated in the server 145.

A user 105 may interact with the multimedia system 100. For example, the user 105 may consume audio/visual content output by the multimedia system 100. In the example shown in FIG. 1, the user 105 may listen to sound from the loudspeakers 115, 120, 125, 130, and 135 and may view video on the user device 110. In some aspects, the user 105 may also control the multimedia system 100. For example, the user 105 may position loudspeaker 115, 120, 125, 130, and 135 and/or the video display(s) within the multimedia system 100, and the user 105 may configure one or more settings of the multimedia system 100.

The number of loudspeakers (five, in the example illustrated in FIG. 1) and positions of loudspeakers within the multimedia system 100 may be referred to herein as a local reproduction setup. The sound output by the local reproduction setup creates what is referred to herein as a sound field 150 or sound image. The sound field 150 refers to the perceived spatial locations of the sound source(s), which may be laterally, vertically, and depth. A surround sound system that provides a good user experience offers good imaging all around the listener. The quality of the sound field arriving at the listener's ear may depend on both the original recording and the local reproduction setup.

Recommended loudspeaker positions are provided by the International Telecommunication Union (ITU) Radiocommunication Sector (ITU-R). For example, ITU-R BS.775-3 provides recommendations for Multichannel stereophonic sound system with and without accompanying picture. In some aspects, a multimedia system 100 may be configured according to the ITU-R recommendations. In some aspects, a multimedia system 100 may not be configured according to the standard ITU-R recommendations, but may be configured at any positions desired by the user (e.g., due to area constraints within a room or environment).

Figure 2:
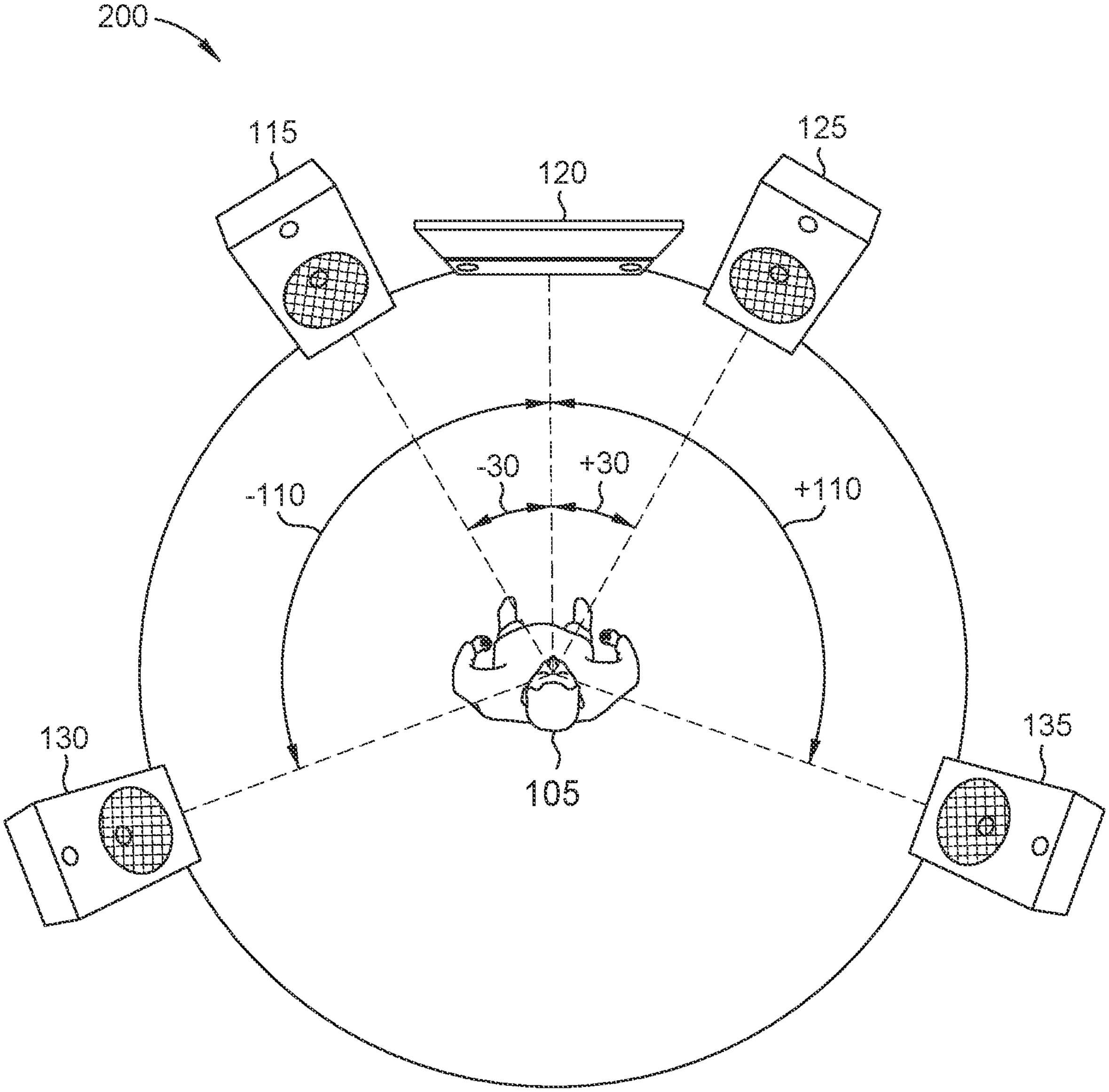
FIG. 2 depicts an example local reproduction setup in the multimedia system of FIG. 1, according to one or more aspects.

FIG. 2 depicts an example local reproduction setup 200 in the multimedia system 100 of FIG. 1, according to one or more aspects. FIG. 2 illustrates local reproduction setup 200 with the five loudspeakers 115, 120, 125, 130, and 135 of example multimedia system 100, however, as discussed herein, different numbers of loudspeakers may be included in the multimedia system with different arrangements.

As shown, the example local reproduction setup 200 includes three front loudspeakers, 115, 120, and 125, combined with two rear/side loudspeakers 130 and 135. Optionally, there may be an even number of more than two rear-side loudspeakers which may provide a larger listening area and greater envelopment for the user. For example, a seven loudspeaker setup may provide two additional side loudspeakers in addition to the left-rear loudspeaker 130 and the right-rear loudspeaker 135.

In some aspects, center loudspeaker 120 may be integrated in a TV (e.g., a high-definition TV (HDTV)) or a soundbar positioned in-front of or below the TV. The left-front loudspeaker 115 and the right-front loudspeaker 125 are placed at extremities of an arc subtending 600 at the reference listening point. As shown in FIG. 2, the left-front loudspeaker 115 is positioned at −30°, where 0° is defined here as the line from the user 105 to the center loudspeaker 120, and where the minus angle is defined in the left, or counter-clockwise, direction from the center line. As shown in FIG. 2, the right-front loudspeaker 125 is positioned at +30° from the center line, and where the positive angle is defined in the right, or clockwise, direction from the center line. The distance between the left-front loudspeaker 115 and the right-front loudspeaker 125 is referred to as the loudspeaker basewidth (B). Where the center loudspeaker 120 is integrated in a screen, the distance between the reference listening point (e.g., user 105) and the screen is referred to as the reference distance and may depend on the height (H) and width (β) of the screen. In some aspects, the center and front loudspeakers, 115, 120, and 125 may be positioned at a height approximately equal to a sitting user (e.g., 1.2 meters).

As shown in FIG. 2, the left-rear loudspeaker 130 is positioned between −100° and −120°, e.g., at −110° as shown, and the right-rear loudspeaker 135 is positioned at between +100° and +120°, e.g., +110° from the center line. In some aspects, the side/rear loudspeakers 130 and 135 may be positioned at a height equal or higher than the front loudspeakers and may have an inclination pointing downward. The side/rear loudspeakers 130 and 135 may be positioned no closer to the reference point than the front/center loudspeakers 115, 120, and 125.

In some aspects, for the example local reproduction setup 200, five audio channels may be used for front left (L), front right (R), centre (C), left side/rear (LS), and right side/rear (RS). Additionally, a low frequency effects (LFE) channel may be included. The LFE channels may carry high level (e.g., loud), low frequency sound effects, this channel is indicated by the "0.1" in a "5.1" surround sound format.

Down-mixing (also referred to as downward mixing or downward conversion) or up-mixing (also referred to as upward conversion or upward mixing) can be performed to reduce or increase the number of channels to a desired number based on the number of delivered signals/channels and the number of available reproduction devices. Down-mixing involves mixing a higher number of signals/channels to a lower format with fewer channels, for example, for a local reproduction setup that does not have enough available loudspeakers to support the higher number of signals/channels. Up-mixing may be used when the local reproduction setup has a greater number of available loudspeakers supporting a higher number of signals/channels than the input number of signals/channels. Up-mixing involves generation of the "missing" channels. ITU-R provides example down-mixing equations and example up-mixing equations.

As mentioned above, while local reproduction setup 200 and multimedia system 100 depict five loudspeakers in an example arrangement, a local reproduction setup may include different numbers of loudspeakers in different arrangements. For example, ITU-R provides recommendations for multimedia systems with three, four, five, and seven loudspeakers for mono-channel systems, mono plus mono surround channel systems, two-channel stereo systems, two-channel stereo plus one surround channel systems, three-channel stereo systems, three-channel stereo plus one surround channels systems, and three-channel stereo plus two surround channels systems. Furthermore, as mentioned above, it should be understood that the local reproduction setup of a multimedia system may be configured in a non-standardized loudspeaker arrangement (e.g., configured with any arbitrary arrangement of two or more loudspeakers). In this case, information about the local reproduction setup (e.g., such as, number of loudspeakers, positions of loudspeakers relative to a reference point, etc.) is provided to the system.

With channel-based audio, the channels can be mixed according to a pre-established speaker layout (e.g., stereo, 5.1 surround, or any of the other systems discussed above) and are then distributed (e.g., streamed, stored in a file or DVD, etc.). In a studio, the recorded sounds pass through a panner that controls how much sound should be placed on each output channel. For example, for a 5.1 surround mix and a sound located somewhere between center and right, the panner will place a portion of the signal on the center and right channels, but not on the remaining channels. The outputs of the panners are mixed (e.g., using a bus) before distribution. That is, the left output of all panners is mixed and placed on the left channel, same for the right channel, and so on. During reproduction, each audio signal is sent to the loudspeaker corresponding to the audio signal. For example, the mixed audio signal for (L) is provided to the left-front loudspeaker, the mixed audio signal for (R) is provided to right-front loudspeaker, and so on.

For object-based audio, instead of mixing all sounds in the studio and distributing the final mix, all of the sounds can be independently distributed and then mixed during reproduction. Thus, like for channel-based audio, panners are used during recording to position the sound, but the panning information is not applied to mix the sound at this stage. Instead, metadata is used to indicate where the sounds should be positioned. The metadata is distributed along with the audio channels and during reproduction the panning information is actually applied to the sound based on the actual local reproduction setup. The panning information for a particular object may not be static but changing in time. The panning information may indicate the position of the sound, the size of the sound (e.g., the desired spread or number of loudspeakers for the sound), or other information. Each sound and its corresponding metadata is referred to as an "object."

Although not shown in FIG. 1, multimedia system 100 may include a renderer. In some aspects, the renderer may be implemented on the input controller. In some aspect, one or more renderers may be implemented in a receiver or decoder (which itself may be implemented in the input controller). The renderer is the component where the audio and its associated metadata are combined to produce the signal that will feed the loudspeakers of the local reproduction setup.

In the case that the local reproduction setup conforms to a known standard layout (e.g., as defined in ITU-R 775.3), the renderer may be pre-programmed with the standard layouts. The renderer is able to map the audio signals to the output loudspeaker signals. In the case that an unknown local reproduction setup is used, the render is provided with information about the local reproduction setup with information, such as (i) the number of loudspeakers and (ii) the positions (e.g., angle and/or distance) of the loudspeakers relative to a reference position.

Although not shown in FIG. 1, multimedia system 100 may include a decoder. In some aspects, the decoder may be implemented with the renderer. In some aspects, the decoder may be implemented on the input controller. The decoder is the component that decodes an audio signal and its associated metadata.

With object-based audio, the user 105 can make choices about the configuration of the audio, which can be added to the mix, to optimize the user's experience. For example, the user 105 can select the audio type (mono, stereo, surround, binaural, etc.), adjust particular audio signals (e.g., turn up the sound for dialogue, where dialogue is provided as an independent object), omit certain audio signals (e.g., turn off commentary on a sports game, where the commentary is provided as an independent object), select certain audio signals (e.g., select a language option for dialogue, where different languages for the dialogue are provided as independent objects), or other user preferences.

As mentioned above, the sounds output by the local reproduction setup produce the sound field 150 (or sound image). In a stereophonic sound reproduction setup including a left and a right loudspeaker (e.g., loudspeakers 115 and 125) radiating sound into a listening area in front of the loudspeakers, optimal stereophonic sound reproduction can be obtained in the symmetry plane between the two loudspeakers (as shown in FIG. 1). If substantially identical signals are provided to the two loudspeakers, a listener (e.g., user 105) sitting in front of the loudspeakers in the symmetry plane will perceive a sound image in the symmetry plane between the loudspeakers. However, if the listener for instance moves to the right relative to the symmetry plane, the distance between the listener and the right loudspeaker will decrease and the distance between the listener and the left loudspeaker will increase, resulting in that the perceived sound image will move in the direction of the right loudspeaker, even though identical signals are still applied to the two loudspeakers. Thus, generally, the perceived position of specific sound images in the total stereo image will depend on the position of the listener relative to the local loudspeaker setup. This effect is, however, not desirable as a stable stereophonic sound image is desired, i.e., a sound image in which the position in space of each specific detail of the sound image remains unchanged when the listener moves in front of the loudspeakers.

Figure 3:
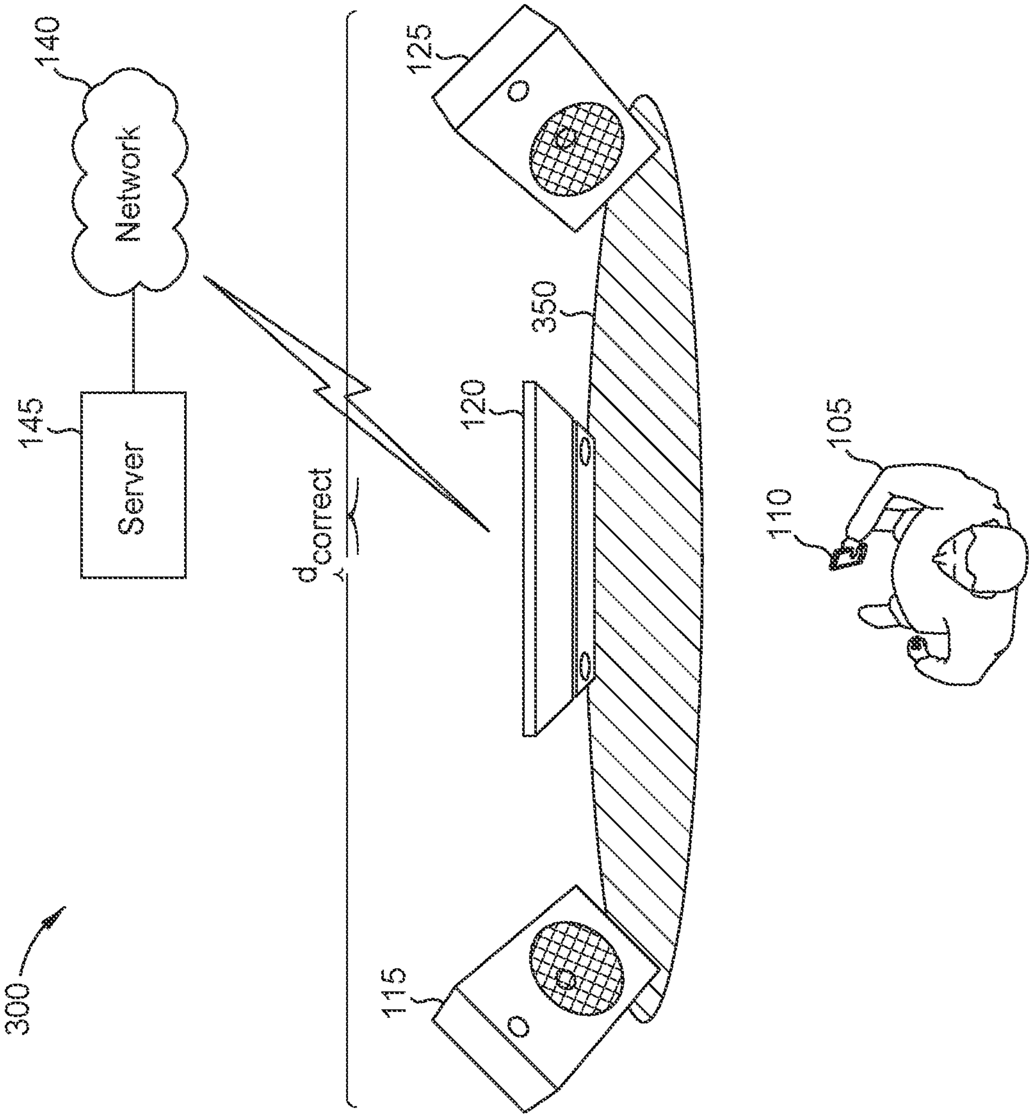
FIG. 3 depicts a block diagram of a sound field in a multimedia system with correct loudspeaker positioning, according to one or more aspects.

In addition, the perceived sound image changes when the loudspeakers are incorrectly positioned. When the loudspeakers are placed with the correct amount of separation distance between the loudspeakers, the sounds produced by the loudspeakers are naturally decorrelated at the listener's ear. This natural decorrelation provides a pleasing sound image and wide sound stage, resulting in a good user experience. FIG. 3 depicts a block diagram of a sound field 350 in a multimedia system 100 with correct placement of the loudspeakers 115 and 125, according to one or more aspects. As shown in FIG. 3, the loudspeakers 115 and 125 have a correct distance, $d_{correct}$, between them that provides natural decorrelation and a desired sound image (e.g., sound field 350) for the user 105. It should be understood that the correct distance, $d_{correct}$, may vary depending on the local reproduction setup, such as the size of the speakers and the distance of the speakers to a reference point (e.g., the user 105 position) as well the room acoustics.

Figure 4:
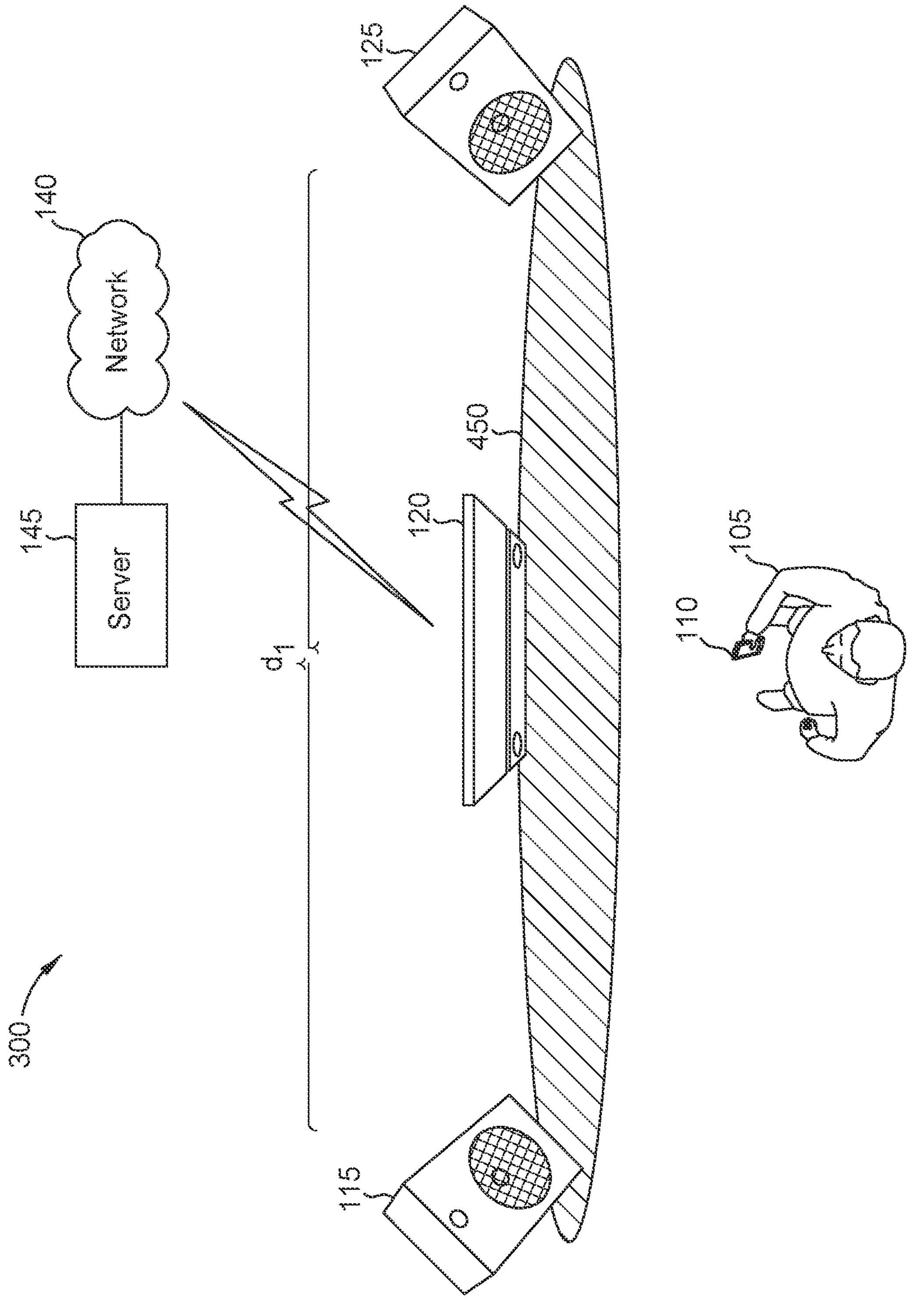
FIG. 4 depicts an example of a sound field in the multimedia system of FIG. 3 with the loudspeakers incorrectly positioned too far apart, according to one or more aspects.

FIG. 4 depicts an example of a degraded sound field 450 in the multimedia system 100 of FIG. 3 with the loudspeakers 115 and 125 incorrectly positioned too far apart, according to one or more aspects. As shown in FIG. 4, the loudspeakers 115 and 125 are positioned far apart with a distance, $d_1$, between them, where $d_1 > d_{correct}$. Accordingly, the width of the sound field 450 is larger than the width of the desired sound field 350.

Figure 5:
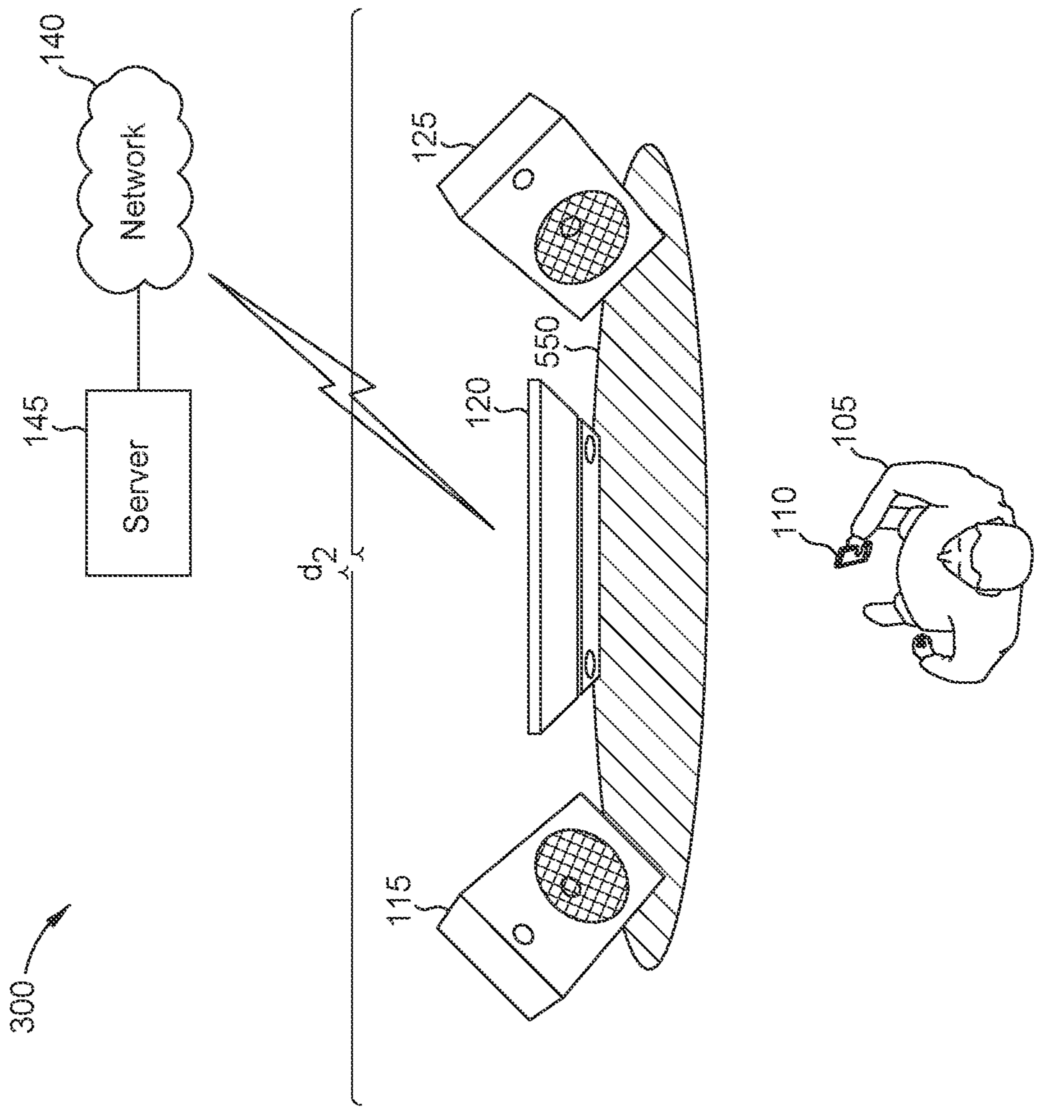
FIG. 5 depicts an example of a sound field in the multimedia system of FIG. 3 with the loudspeakers incorrectly positioned too closely together, according to one or more aspects.

FIG. 5 depicts an example of a degraded sound field 550 in the multimedia system 100 of FIG. 3 with the loudspeakers 115 and 125 incorrectly positioned too closely together, according to one or more aspects. As shown in FIG. 5, the loudspeakers 115 and 125 are positioned closely together with a distance, $d_2$, between them, where $d_2 < d_{correct}$. Accordingly, the width of the sound field 550 is smaller than the width of the desired sound field 350. As discussed above, when the loudspeakers are incorrectly placed too closely together, the sound image may collapse, resulting in little perceived width and poor timbral fidelity.

While aspects of the present disclosure are discussed with respect to two loudspeakers, the aspects described herein for adaptive sound image width enhancement to compensate for incorrectly positioned loudspeakers may be performed for any two speakers in local reproduction setups including any number of loudspeakers.

Accordingly, incorrectly positioned loudspeakers that are either too far apart or too close together may degrade the user's experience. Consequently, there is a need for a loudspeaker setup that does not suffer from this disadvantageous effect of the incorrectly positioned loudspeakers on the perceived sound image.

Example Adaptive Sound Image Width Enhancement

Aspects of the present disclosure provide for sound image width enhancement to compensate for incorrectly positioned loudspeakers.

According to certain aspects, the adaptive sound image width enhancement (ASWE) system adapts to the physical distance, d, between two loudspeakers. For example, the ASWE system may apply adaptive amounts of gain to the audio signal depending on the physical distance, d, between two loudspeakers. In some aspects, the audio signal is decomposed into respective audio components and a respective gain is applied to each of the audio components separately depending the physical distance, d, between two loudspeakers.

In some aspects, when the loudspeakers are correctly positioned, with sufficient separation between them, the ASWE system can be bypassed, as the natural decorrelation will enable the user to perceive the intended sound image. On the other hand, when the loudspeakers are collocated (or close enough to each other to be effectively collocated), the ASWE system may apply a maximum amount of gain. At distances in between the collocated distance and the correct distance, the AWSE system applies gradually decreasing amounts of gain as the distances between the loudspeakers increases, resulting in a combination of natural and synthetic sound image to produce the desired sound image.

Thus, the adaptive sound image width enhancement compensates for the incorrectly positioned loudspeaker, such that although the loudspeakers are positioned too closely together or too far apart, the sound field reproduced by the loudspeakers is perceived by the user with the correct width, providing an enhanced listening experience for the user.

Referring back to the scenario illustrated in FIG. 3, a user 105 is consuming audio content from correctly placed loudspeakers 115 and 125 generating the desired sound field 350. Where the loudspeakers 115 and 125 are incorrectly positioned, the ASWE system can adaptively apply gain to the audio signals to produce the desired sound image.

Figure 6:
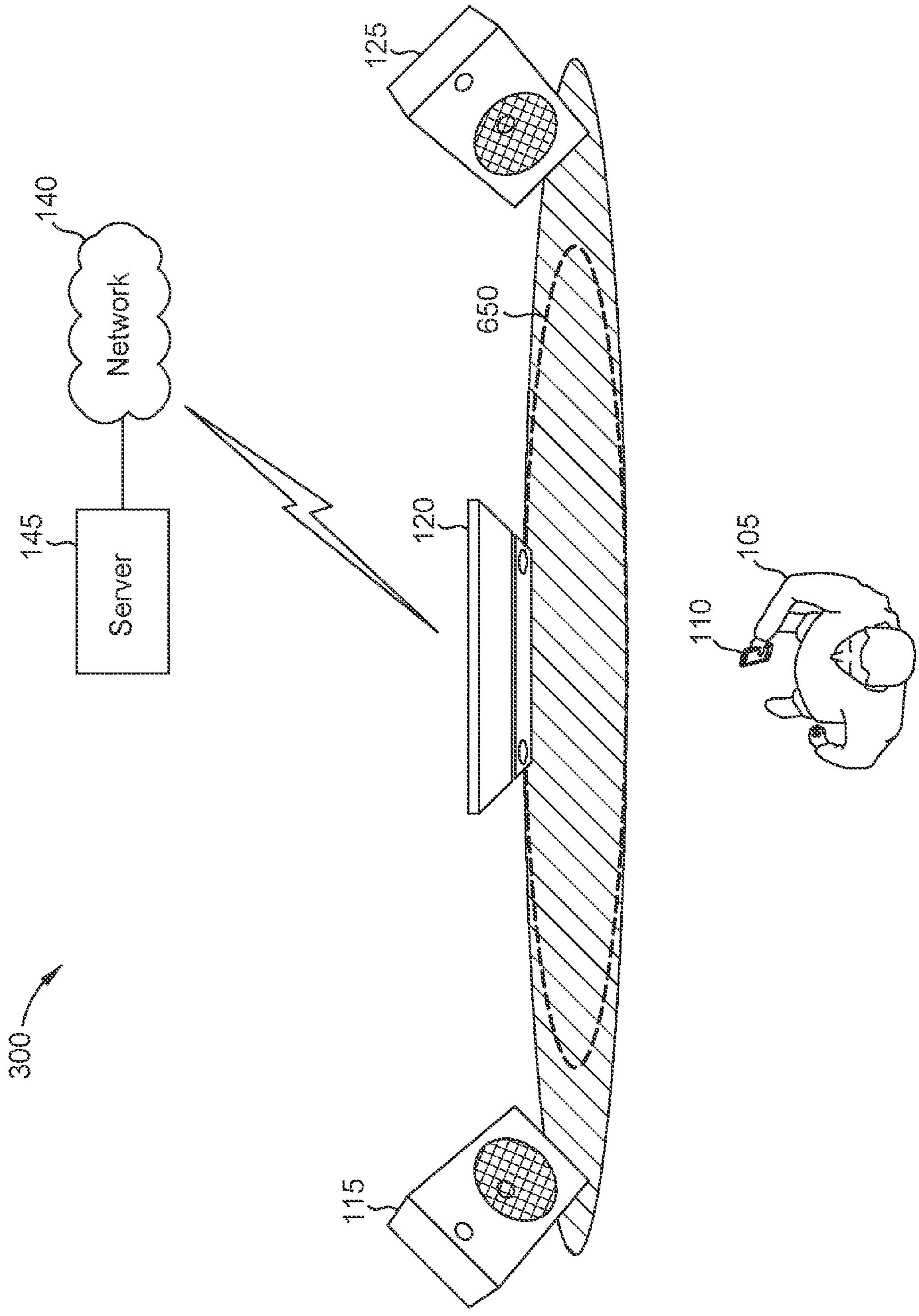
FIG. 6 depicts an example of an adaptively corrected sound field in the multimedia system of FIG. 4 with the loudspeakers incorrectly positioned too far apart, according to one or more aspects.

FIG. 6 depicts an example of an adaptively corrected sound field 650 in the multimedia system 300 of FIG. 4 with the loudspeakers 115 and 125 incorrectly positioned too far apart, according to one or more aspects. As shown in FIG. 6, by applying the adaptive gain to compensate for the incorrect positioning of the loudspeakers 115 and 125, the corrected sound field 650 is produced which matches the desired sound field 350, unlike the degraded sound field 450 produced in FIG. 4 without AWSE.

Figure 7:
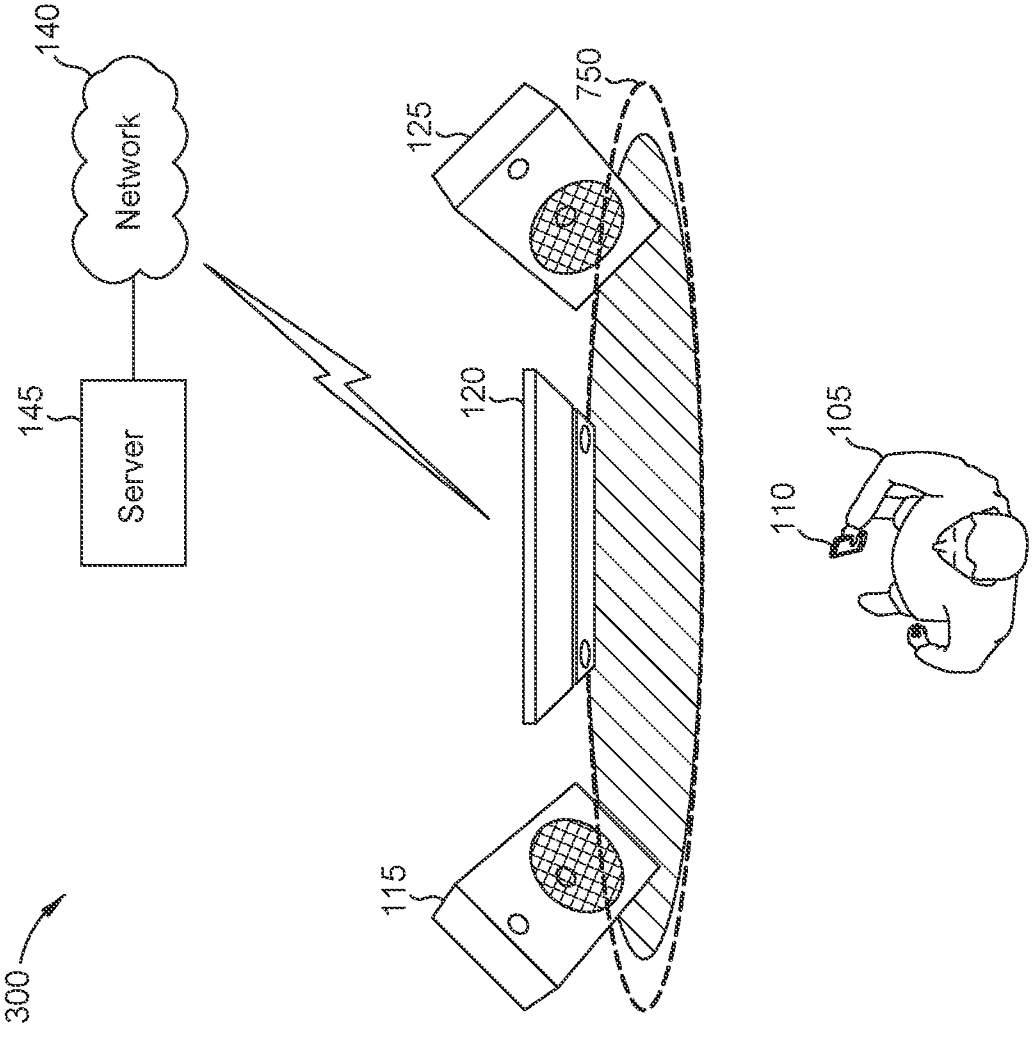
FIG. 7 depicts an example of an adaptively corrected sound field in the multimedia system of FIG. 5 with the loudspeakers incorrectly positioned too closely together, according to one or more aspects.

FIG. 7 depicts an example of an adaptively corrected sound field 750 in the multimedia system 300 of FIG. 5 with the loudspeakers 115 and 125 incorrectly positioned too closely together, according to one or more aspects. As shown in FIG. 7, by applying the adaptive gain to compensate for the incorrect positioning of the loudspeakers 115 and 125, the corrected sound field 750 is produced which matches the desired sound field 350, unlike the degraded sound field 550 produced in FIG. 5 without AWSE.

According to certain aspects, the AWSE adaptively corrects the sound field by applying raw loudspeaker separation distance to input data processing. In some aspects, the AWSE uses one or more mapping functions to map an estimated loudspeaker separation distance to one or more gains applied to one or more audio signals.

Figure 8:
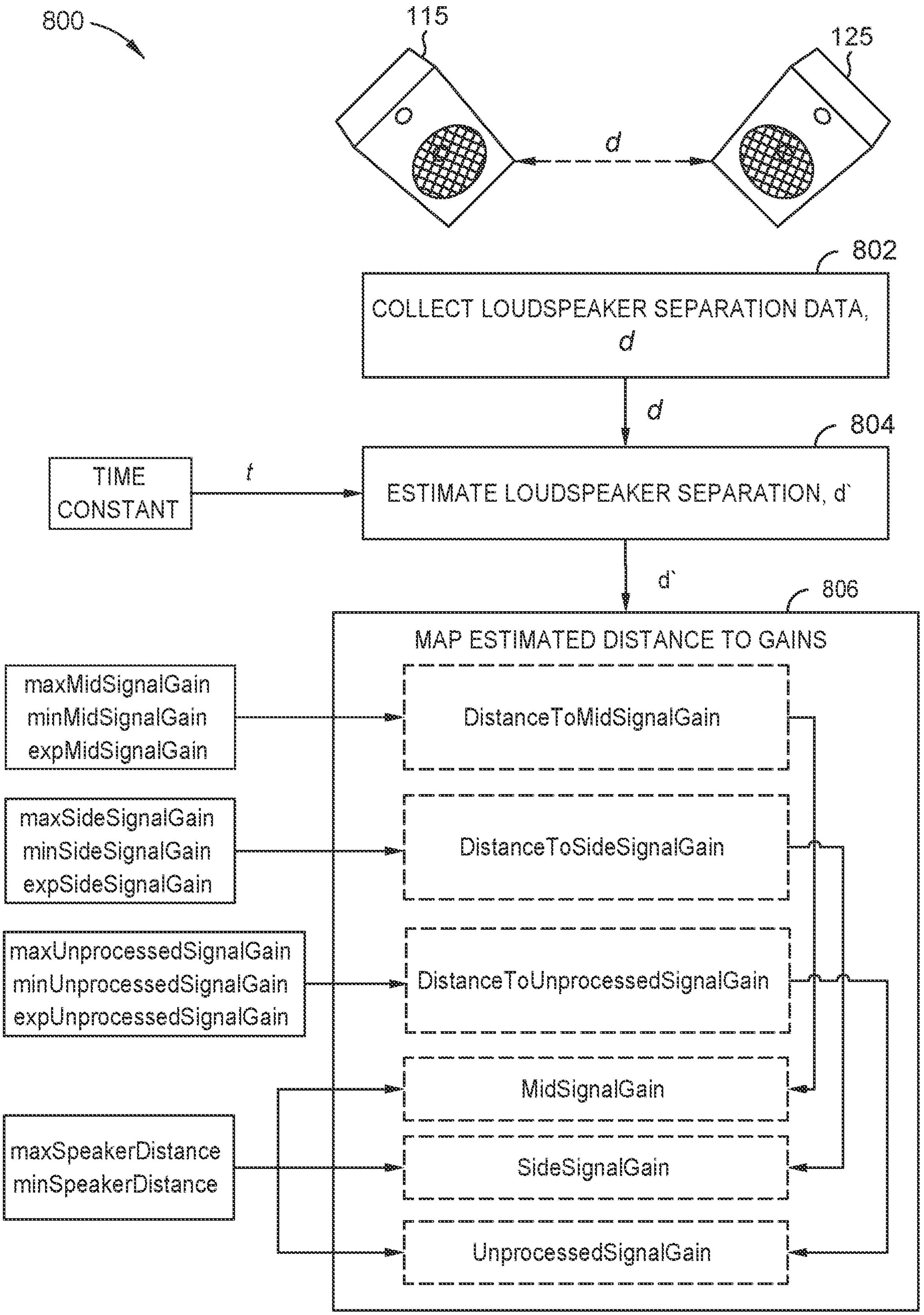
FIG. 8 depicts an example workflow for mapping loudspeaker separation distance to audio signal processing gains for adaptive sound image width enhancement, according to one or more aspects.

FIG. 8 depicts an example workflow 800 for mapping loudspeaker separation distance to audio signal processing gains for adaptive sound image width enhancement, according to one or more aspects.

As shown in FIG. 8, loudspeakers 115 and 125 are positioned with a separation distance, d, between them.

At 802, raw separation distance data, d, is collected. In some aspects, the separation distance, d, can be measured and input to the system by a user. In some aspects, the separation distance, d, can be measured periodically, continuously, when repositioning is detected (e.g., by a motion sensor), and/or upon a request or command from a user. In some examples, the loudspeaker separation distance, d, is measured by Ultra Wide Band sensors, or other sensors.

At 804, the loudspeaker separation distance is estimated, d', from the raw separation distance data, d. In some aspects, a time constant, t, is first used to smooth the raw loudspeaker separation distance data, d. Smoothing the raw loudspeaker separation distance data, d, may filter loudspeaker separation distance data points that occur for only a very short period of time. This helps reduce the sensitivity of the system.

In some aspects, the collection of the raw loudspeaker separation distance data and the processing of the raw loudspeaker separation distance data, at 802 and 804, may be performed at a single integrated device or across multiple devices. In some aspects, the device or system that collects and processes the raw loudspeaker separation distance data is implemented on another device within the system. For example, the loudspeaker separation distance data collection and processing may be implemented on a loudspeaker (e.g., one or multiple of the loudspeakers 115 and 125) within the local reproduction system (e.g., multimedia system 100) or implemented on a control unit within the system. In some aspects, the loudspeaker separation distance data collection and processing may be implemented on a separate stand-alone device within the system. In some aspects, the loudspeaker separation distance data processing could be performed outside of the system, such as by a remote server (e.g., server 145).

After estimating the loudspeaker separation distance, d', the workflow 800 proceeds to 806, in which the estimated loudspeaker separation distance, d', is mapped to one or more audio signal gains.

In some aspects, mid/side processing is applied to augment the natural decorrelation in the audio signal. Since the distance between the loudspeakers 115 and 125 is known, the amount of decorrelation imposed by the processor can be dynamically varied. In the illustrated example in FIG. 8, the mapping function computes three gains, midSignalGain, sideSignalGain unprocessedSignalGain to be applied to the mid signal, side signal, and unprocessed signal, respectively.

Before applying the gain, the input audio signal is decomposed into separate signal components. The type of audio signal decomposition depends on the number of channels of the input audio signal.

For mono (1 channel input audio), a pseudo stereo technique can be used whereby the input audio signal is artificially processed to generate two new signals which acts to enhance the width of the perceived image. Subsequently, the original input signal takes on the midSignal while the two artificially generated signals represent the sideSignal.

For stereo (2 channel input audio), mid-side decomposition can be performed. The midSignalrepresents a common signal component (e.g., those properties which are common across all channels of the input audio signal). The midSignal is one channel of audio, such that for a two-channel input signal:

$$M=0.707*(L+R),$$

where M=midSignal, L=left input audio channel, R=right input audio channel, and 0.707 is a scaling factor to ensure the total energy of the input signals is preserved. The sideSignal represents the differences per input audio channel between the input audio channel and a proportion of the other input audio channel(s). The sideSignal is S channels, where S is the number of input audio channels, such that for a two-channel input signal:

$$S_L=L-(f*R); \text{ and}$$

$$S_R=R-(f*L),$$

where $S_L$ and $S_R$ represent the two channels of the sideSignal, L=left input audio channel, R=right input audio channel and f=contribution factor {0 . . . 1}.

For multichannel audio (more than 2 channel audio input), the stereo mid-side processing technique can be used because multichannel formats are simply multiple pairs of stereo images (e.g., 5.1 audio corresponds to 2× stereo pairs: frontL/frontR and surroundL/surroundR). The stereo mid-side processing can be applied across each left-right pair.

In addition to mid-side signal component decomposition, a number of filters may be applied to each decomposed audio signal. The filtering tailors the spectral content of each decomposed audio signal. For example, a wider sound image may be perceived if some of the low frequency energy is removed from the side signal, as low frequencies tend to constructively interfere at the ear canals (e.g., due to long wavelengths), which may lead to a narrowing of the sound image.

The unprocessed signal represents the input audio signal without any signal processing applied. Since the mid and side processing does not introduce delay, the unprocessed signal does not require any delay compensation. If delay is introduced into the mid and/or side signals, then compensation delay may be applied in all other signal paths to ensure time-alignment.

A mapping function computes each of the gains to apply to the decomposed (e.g., and filtered) component audio signals based on the estimated distance, d', and a number of boundary conditions. As shown in FIG. 8, a maximum speaker distance (maxSpeakerDistance) and a minimum speaker distance (minSpeakerDistance) is applied to each of the gains. The maximum speaker distance is the maximum physical distance (e.g., around 2 m) between the speakers up to which the ASWE will have an effect and the minimum speaker distance is the minimum physical distance (e.g., around 0 m to 0.1 m) between the speakers down to which the ASWE will have an effect. Accordingly, if the estimated loudspeaker separation distance, d', between the loudspeakers 115 and 125 is smaller than the minimum speaker distance boundary condition, no additional processing gain is applied. That is, for any value of 0<d'<minSpeakerDistance, the same gain is applied as the gain for d'=minSpeakerDistance. Similarly, if the estimated loudspeaker separation distance, d', between the loudspeakers 115 and 125 is larger than the maximum speaker distance boundary condition, no additional processing gain is applied. That is, for any value of d'>maxSpeakerDistance, the same gain is applied as the gain for d'=maxSpeakerDistance.

The midSignalGain may be mapped based on estimated loudspeaker separation distance, d', the boundary conditions maxSpeakerDistance and minSpeakerDistance, and a mapping (e.g., a function, table, or other mapping) DistanceToMidSignalGain. The DistanceToMidSignalGain has boundary conditions maximum mid signal gain (maxMidSignalGain) that is the maximum gain applied to the mid signal; minimum mid signal gain (minMidSignalGain) that is the minimum gain applied to the mid signal; and is optionally further based on a mid signal gain exponent factor (expMidSignalGain) that controls the linearity of the midSignalGain mapping function. The maxMidSignalGain and minMidSignalGain are each equal to or greater than zero, and the maxMidSignalGain is equal to or greater than the minMidSignalGain.

The sideSignalGain may be mapped based on estimated loudspeaker separation distance, d', the boundary conditions maxSpeakerDistance and minSpeakerDistance, and a mapping (e.g., a function, table, or other mapping) Distance ToSideSignalGain. The DistanceToSideSignalGain has boundary conditions maximum side signal gain (maxSideSignalGain) that is the maximum gain applied to the side signal; minimum side signal gain (minSideSignalGain) that is the minimum gain applied to the side signal; and is optionally further based on a side signal gain exponent factor (expSideSignalGain) that controls the linearity of the sideSignalGain mapping function. The maxSideSignalGain and minSideSignalGain are each equal to or greater than zero, and the maxSideSignalGain is equal to or greater than the minSideSignalGain.

The unprocessedSignalGain may be mapped based on estimated loudspeaker separation distance, d', the boundary conditions maxSpeakerDistance and minSpeakerDistance, and a mapping (e.g., a function, table, or other mapping) Distance ToUnprocessedSignalGain. The DistanceToUnprocessedSignalGain has boundary conditions maximum unprocessed signal gain (maxUnprocessedSignalGain) that is the maximum gain applied to the unprocessed signal; minimum unprocessed signal gain (minUnprocessedSignalGain) that is the minimum gain applied to the unprocessed signal; and is optionally further based on an unprocessed signal gain exponent factor (expUnprocessedSignalGain) that controls the linearity of the unprocessedSignalGain mapping function. The maxUnprocessedSignalGain and minUnprocessedSignalGain are each equal to or greater than zero and equal to or less than one, and the maxUnprocessedSignalGain is equal to or greater than the minUnprocessedSignalGain.

In some aspects, the unprocessed signal gain is inversely proportion of the mid signal gain and the side signal gain. For example, where the estimated loudspeaker separation distance is at the minimum speaker distance (d'=minSpeakerDistance), sideSignalGain=maxSideSignalGain, midSignalGain=maxMidSignalGain, and unprocessedSignalGain=minUnprocessedSignal, and where the estimated loudspeaker separation distance is at the maximum speaker distance (d'=maxSpeakerDistance), sideSignalGain=minSideSignalGain, midSignalGain=minMidSignalGain, and unprocessedSignalGain=maxUnprocessedSignalGain.

For the estimated loudspeaker separation distance, d', in between the maxSpeakerDistance and minSpeakerDistance, the value of the midSignalGain applied to the mid signal and the value of the sideSignalGain applied to the side signal decrease as the distance, d', increases, from the maxMidSignalGain to the minMidSignalGain and from the maxSideSignalGain to the minSideSignalGain, respectively. In some aspects, the gain decreases linearly or exponentially between the maximum and the minimum gains. Similarly, the value of the unprocessedSignalGain applied to the unprocessed signal increases as the distance, d', increases, from the minUnprocessedSignalGain to the maxUnprocessedSignalGain. In some aspects, the unprocessed signal gain increases linearly or exponentially between the minimum and the maximum gains.

In some examples, the mappings are configured by the user. In some examples, the mappings are preconfigured in one or more look-up tables or functions.

In some aspects, for any given value of d', it is beneficial that the sum of squares of all of the gains equals one (e.g., [$midSignalGain^2+sideSignalGain^2+unprocessedSignalGain^2=1.0$]). This ensures that the total energy of the system remains unchanged. In some aspects, after setting all parameters of the mapping function, a recursive algorithm can be run to refit the parameters such that energy is preserved for all values of d' and modifying the mapping function if needed. In some examples, the parameters of the mapping functions may be fixed and an additional compensationGain value can be calculated at the output of the algorithm and applied to the signal such that the total energy of the system remains unchanged. In some examples, the compensationGain value is equal to the difference in the energy before ASWE and the energy after ASWE. In some aspects, the compensationGain value is applied directly before the output of the ASWE. In some aspects, a time constant is applied to the compensationGain value to prevent rapid audible fluctuations.

In some aspects, the mapping of the estimated loudspeaker separation distance to the respective correction gains, at 806, may be performed at a single integrated device or across multiple devices. In some aspects, the device or system that maps the estimated loudspeaker separation distance to the respective correction gains is implemented on another device within the system. For example, the mapping of the estimated loudspeaker separation distance to the respective correction gains may be implemented on a loudspeaker (e.g., one or multiple of the loudspeakers 115 and 125) within the local reproduction system (e.g., multimedia system 100) and informed to the other loudspeakers, or performed separately at each of the loudspeakers, or implemented on a control unit within the system. In some aspects, the mapping of the estimated loudspeaker separation distance to the respective correction gains may be implemented on a separate stand-alone device within the system. In some aspects, the mapping of the estimated loudspeaker separation distance to the respective correction gains could be performed outside of the system, such as by a remote server (e.g., server 145).

Figure 9:
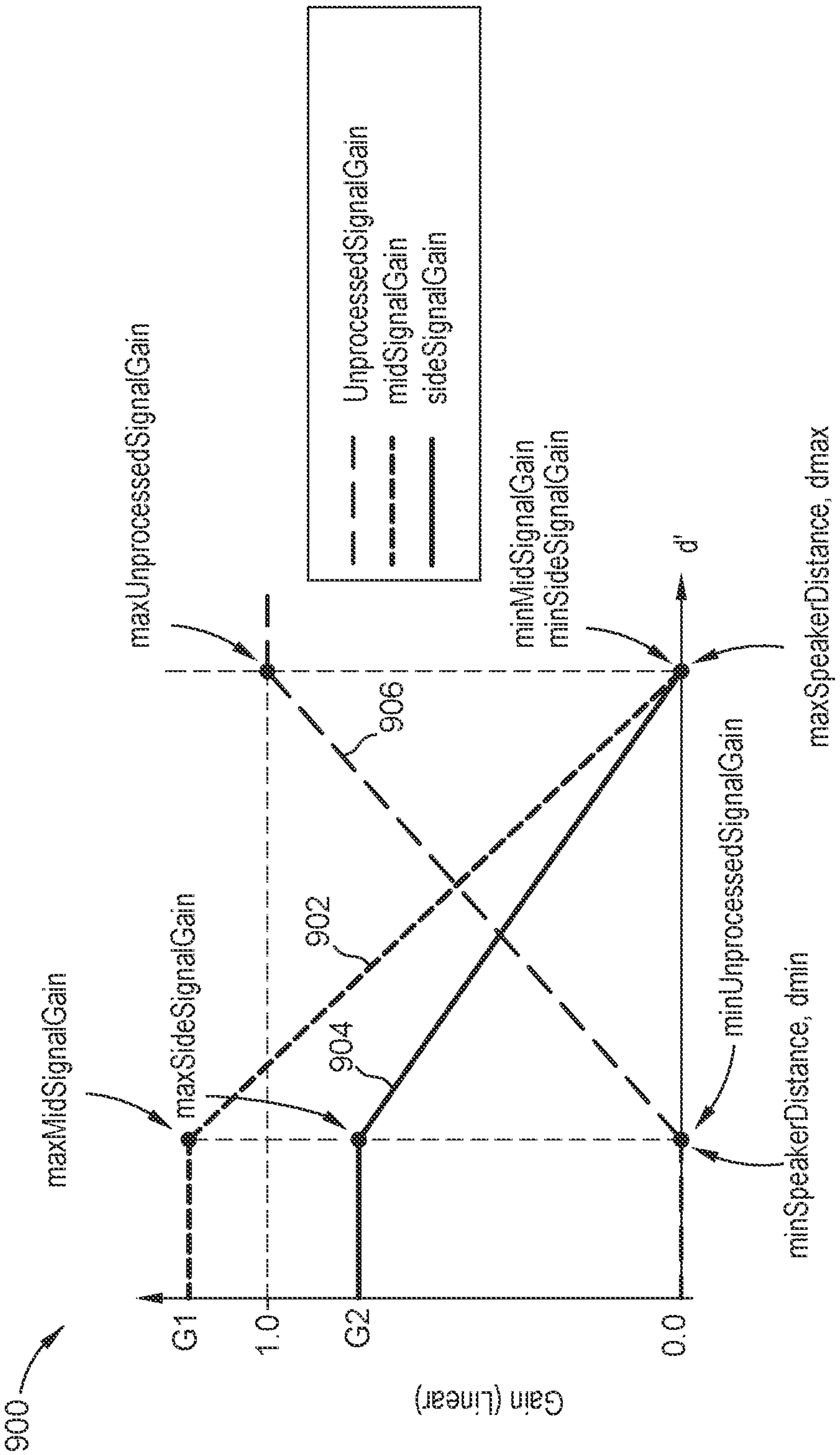
FIG. 9 is a graph illustrating example mid signal gain, side signal gain, and unprocessed signal gain, as a function of estimated loudspeaker separation distance with boundary conditions, according to one or more aspects.

FIG. 9 is a graph 900 illustrating an example mid signal gain 902, side signal 904, and unprocessed signal gain 906, as a function of estimated loudspeaker separation distance, d', and with the boundary conditions. As shown in graph 900, the mid signal gain 902, side signal 904, and unprocessed signal gain 906 are bound by the minimum speaker distance, at $d_{min}$, and the maximum speaker distance, at $d_{max}$. In the example illustrated in graph 900, the minimum unprocessed signal gain, the minimum mid signal gain and the minimum side signal gain are each zero (−∞ dB). In the example illustrated in graph 900, the maximum unprocessed signal gain is one (0 dB), the maximum mid signal gain is greater than one ($G_1$), and the maximum side signal gain is less than one ($G_2$). In the example illustrated in graph 900, the exponent factor for each of the signal gains is zero (i.e, the gains vary linearly).

Figure 10:
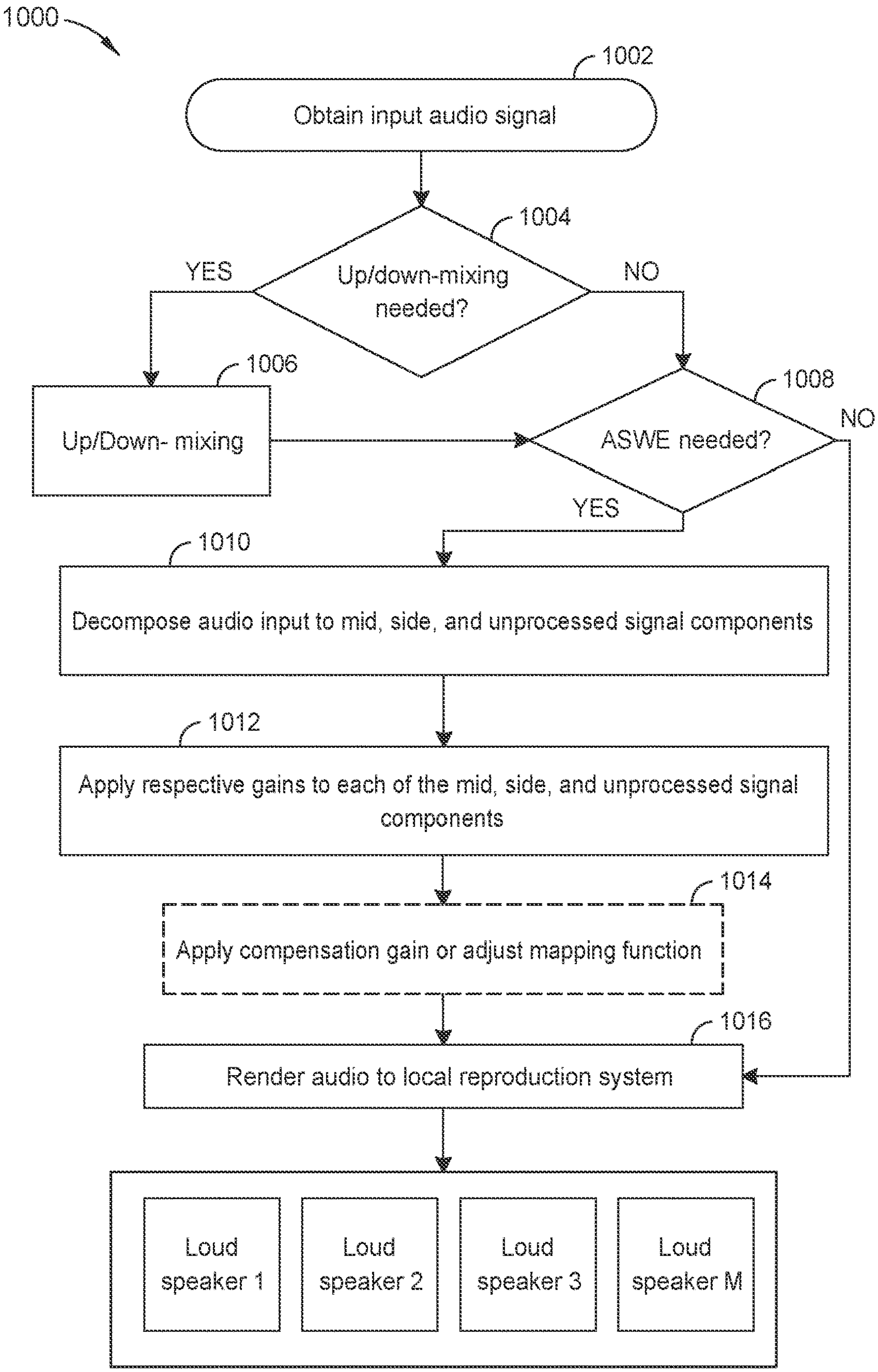
FIG. 10 depicts an example workflow for adaptive sound image width enhancement after up/down-mixing, according to one or more aspects.

FIG. 10 depicts an example workflow 1000 for adaptive sound image width enhancement after up/down-mixing, according to one or more aspects.

As shown, the system obtains an input audio signal at 1002. The input audio signal may be mono, stereo, surround, 5.1 surround, 7.1 surround, or other type of audio input signal. In the example illustrated in FIG. 10, the input audio signal can then be upmixed or downmixed if needed. As shown, at 1004, the system determines whether upmixing or downmixing is needed or desired. If the system determines, at 1004, that upmixing or downmixing is needed or desired, then at 1006 the upmixing or downmixing is performed.

After the upmixing or downmixing, at 1006, then at 1008 it is determined whether adaptive sound width enhancement is needed, or desired, for the upmixed or downmixed signal. The ASWE algorithm may be performed independently (e.g., duplicated or with different ASWE settings) for each channel output by the up/downmixing.

Alternatively, if the system determines, at 1004, that upmixing or downmixing is not needed or desired for the input audio signal, then the system may proceed directly to 1008 and determines whether ASWE is needed or desired for the input audio signal.

The determination of whether ASWE is needed or desired, at 1008, depends on the loudspeaker separation distance (e.g., the estimated loudspeaker separation distance, d', as discussed above with respect to 804 in FIG. 8). As discussed herein, ASWE may be needed when the loudspeakers are incorrectly positioned. In some aspects, where the loudspeaker separation distance is greater than the maxSpeakerDistance or smaller than the minSpeakerDistance, ASWE is not performed.

Where the system determines, at 1008, that ASWE is not needed or desired (e.g., where the loudspeakers are correctly positioned, or positioned within an acceptable tolerance), the system may proceed to rendering the audio to the local reproduction system (e.g., to the available loudspeakers 1 . . . M of an example reproduction system) at 1016. Alternatively, where the system determines, at 1008, that ASWE is needed or desired, then at 1010 the system decomposes the audio input to mid, side, and unprocessed signal components.

At 1012, the system applies respective correction gains to each of the mid, side, and unprocessed signal components. For example, the system may apply the gains based on the mapping discussed herein with respect to 806 in FIG. 8. As discussed, the respective gain applied to each of the mid, side, and unprocessed signal components depends on the estimated loudspeaker separation distance, d, a number of boundary conditions, and a mapping.

As further discussed herein, in some aspects, the mapping is determined recursively, until the sum of the squares of each of the gains is equal to one, such that the energy of the system is unchanged. Alternatively, an additional compensation gain can be applied such that the sum of squares of the gains is equal to one and the energy of the system is unchanged. As shown in FIG. 10, optionally, at 1014, an additional compensation gain is applied or the mapping function is adjusted. After applying the gains, the system may proceed to rendering the audio to the local reproduction system at 1016. The decomposed mid, side, and unprocessed signal components may first be combined using the gains.

Figure 11:
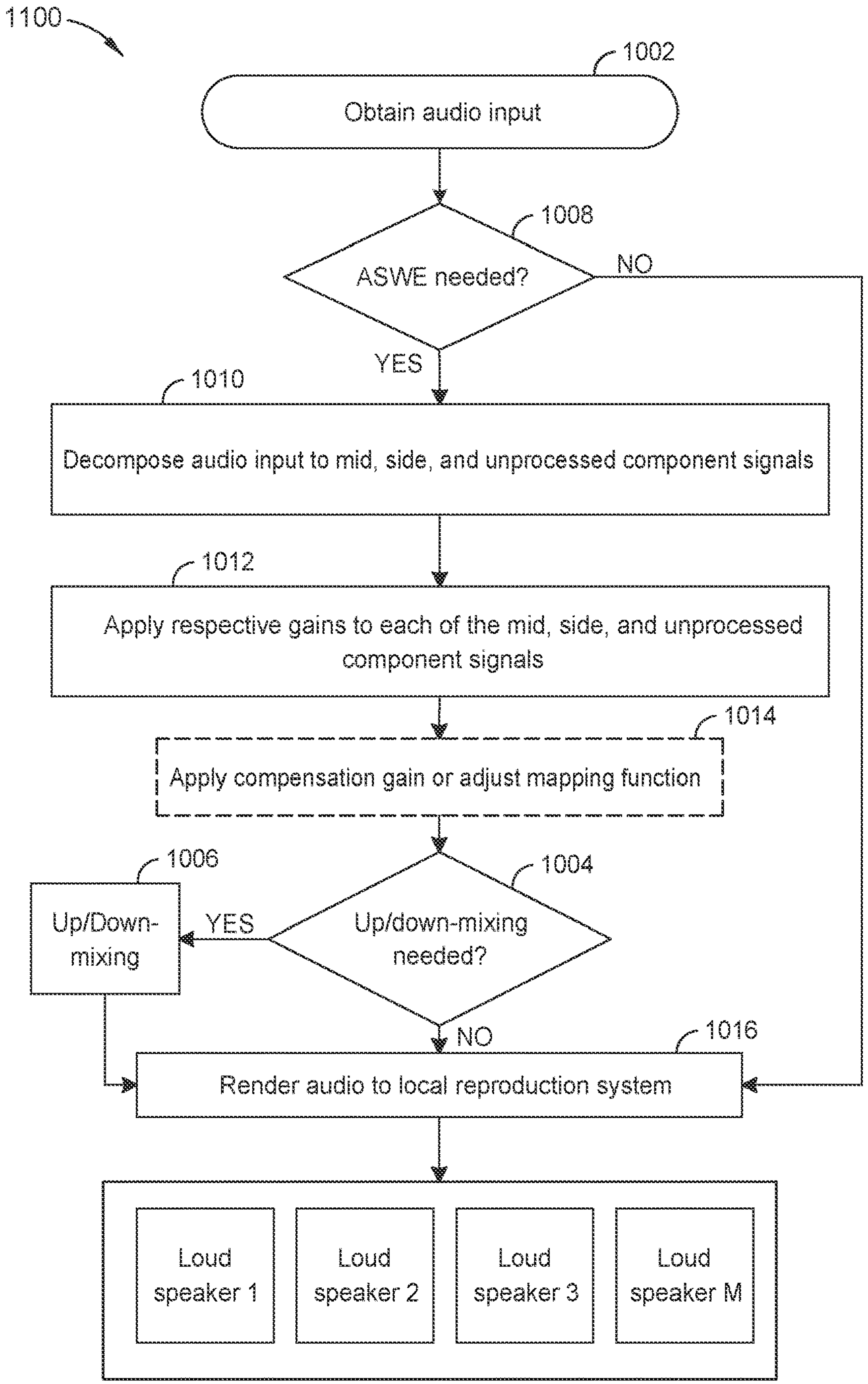
FIG. 11 depicts an example workflow for adaptive sound image width enhancement before up/down-mixing, according to one or more aspects.

While FIG. 10 illustrates the upmixing or downmixing performed before ASWE, alternatively, the upmixing or downmixing can be performed after the ASWE, as shown in FIG. 11. The ASWE algorithm may be performed independently (e.g., duplicated or with different ASWE settings) for each channel output by the up/downmixing.

In some aspects, the output of the ASWE is a mid-side format. A mid-side to left/right conversion may be applied.

According to certain aspects, in addition to ASWE based on loudspeaker separation distance, the ASWE can be further performed based on additional information. For example, additional sensors may provide information about acoustic properties of the room. In one illustrative example, for larger detected values of RT60, the maximum gain of the decorrelation may be reduced.

The aspects described herein provide a technical solution to a technical problem associated with incorrect loudspeaker positioning. More specifically, implementing the aspects herein allows for adaptive sound image width enhancement to correct for the incorrect loudspeaker positioning. For example, with the AWSE, the generated sound image width for the incorrectly positioned loudspeakers may match a desired sound image width associated with correctly positioned loudspeakers.

Example Method for Adaptive Sound Image Width Enhancement

Figure 12:
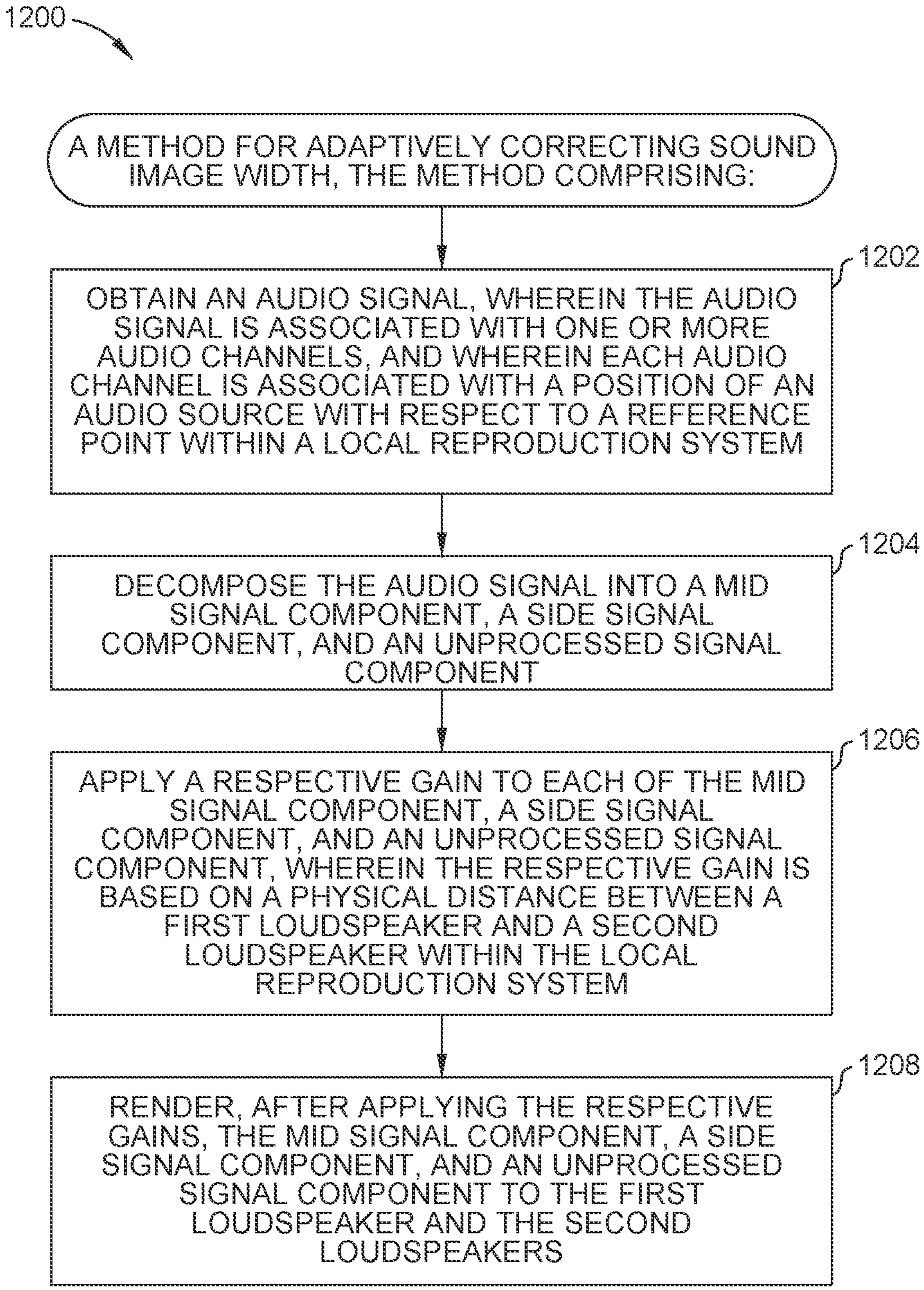
FIG. 12 depicts an example flow diagram for adaptive sound image width enhancement, according to one or more aspects.

FIG. 12 is a flow diagram illustrating operations 1200 for adaptively correcting sound image, according to one or more aspects. The operations 1200 may be understood with reference to the FIGS. 1-11.

Operations 1200 may begin, at operation 1202, with obtaining an audio signal. The audio signal is associated with one or more audio channels. Each audio channel is associated with a position of an audio source with respect to a reference point within a local reproduction system (e.g., such as multimedia system 100 illustrated in the FIG. 1).

Operations 1200 include, at 1204, decomposing the audio signal into a mid signal component, a side signal component, and an unprocessed signal component.

Operations 1200 include, at 1206, applying respective correction gains to each of the mid signal component (e.g., midSignalGain), side signal component (e.g., sideSignalGain), and unprocessed signal component (e.g., unprocessedSignalGain). The respective correction gains are based on a physical distance (d) between a first loudspeaker (e.g., loudspeaker 115) and a second loudspeaker (e.g., loudspeaker 125) within the local reproduction system.

In some aspects, operations 1200 include, collecting raw distance data between the first loudspeaker and the second loudspeaker; applying a time constant (t) to smooth the raw distance data; and estimating the distance (d') between the first loudspeaker and the second loudspeaker based on the smoothed raw distance data.

In some aspects, applying the respective correction gains, at 1206, includes applying a respective correction gain of zero (0 dB) to each of the mid signal component, side signal component, and unprocessed signal component when the physical distance between the first loudspeaker and the second loudspeaker is greater than a maximum threshold (e.g., maxSpeakerDistance), smaller than a minimum threshold (e.g., minSpeakerDistance), or matches a target physical distance (e.g., correct loudspeaker separation distance).

In some aspects, applying the respective correction gains, at 1206, includes applying a configured maximum mid signal gain value (e.g., maxMidSignalGain), maximum side signal gain value (e.g., maxSideSignalGain), and minimum unprocessed signal gain value (e.g., minUnprocessedSignalGain) when the physical distance between the first loudspeaker and the second loudspeaker is at a configured minimum distance (e.g., minSpeakerDistance).

In some aspects, applying the respective correction gains, at 1206, includes applying a configured minimum mid signal gain value (e.g., minMidSignalGain), minimum side signal gain value (e.g., minSideSignalGain), and maximum unprocessed signal gain value (e.g., maxUnprocessedSignalGain) when the physical distance between the first loudspeaker and the second loudspeaker is at a configured maximum distance (e.g., maxSpeakerDistance).

In some aspects, applying the respective correction gains, at 1206, includes applying a configured mid signal gain value between the minimum mid signal gain value and the maximum mid signal gain value, side signal gain value between the minimum side signal gain value and the maximum side signal gain value, and unprocessed signal gain value between the minimum unprocessed signal gain value and the maximum unprocessed signal gain value when the physical distance between the first loudspeaker and the second loudspeaker is between the configured minimum and maximum distance.

In some aspects, the configured values are based on a configured mapping of correction gains to physical loudspeaker separation distances, a configured look-up table of correction gains to physical loudspeaker separation distances, a correction gain function based on physical loudspeaker separation distances, one or more boundary conditions, or a combination thereof.

In some aspects, applying the respective correction gains, at 1206, includes applying the respective correction gains that generates a sound image from the first and second loudspeakers with the physical distance matching a target sound image associated with the loudspeakers at a target physical distance.

In some aspects, operations 1200 further include, determining a difference between a total energy of the audio signal before applying the respective correction gains and the total energy of the audio signal after applying the respective correction gains (e.g., whether the sum of squares of the corrective gains is equal to one) and applying a compensation gain (e.g., CompensationGain) to the audio signal based on the difference.

In some aspects, operations 1200 further include, performing upmixing or downmixing on the audio signal before decomposing the audio signal, at 1204, or after applying the respective correction gains at 1206.

In some aspects, decomposing the audio signal, at 1204, and applying the respective correction gains, at 1206 are performed independently for each of the audio channels. In some aspects, the respective correction gains are the same for each of the audio channels. In some aspects, the respective correction gains are different for each of the audio channels.

In some aspects, the respective correction gains are further based on one or more detected acoustic parameters (e.g., RT60).

Operations 1200 include, at 1208, rendering, after applying the respective correction gains, the mid signal component, the side signal component, and the unprocessed signal component to the first loudspeaker and the second loudspeaker.

Example Adaptive Sound Image Width Enhancement Device

Figure 13:
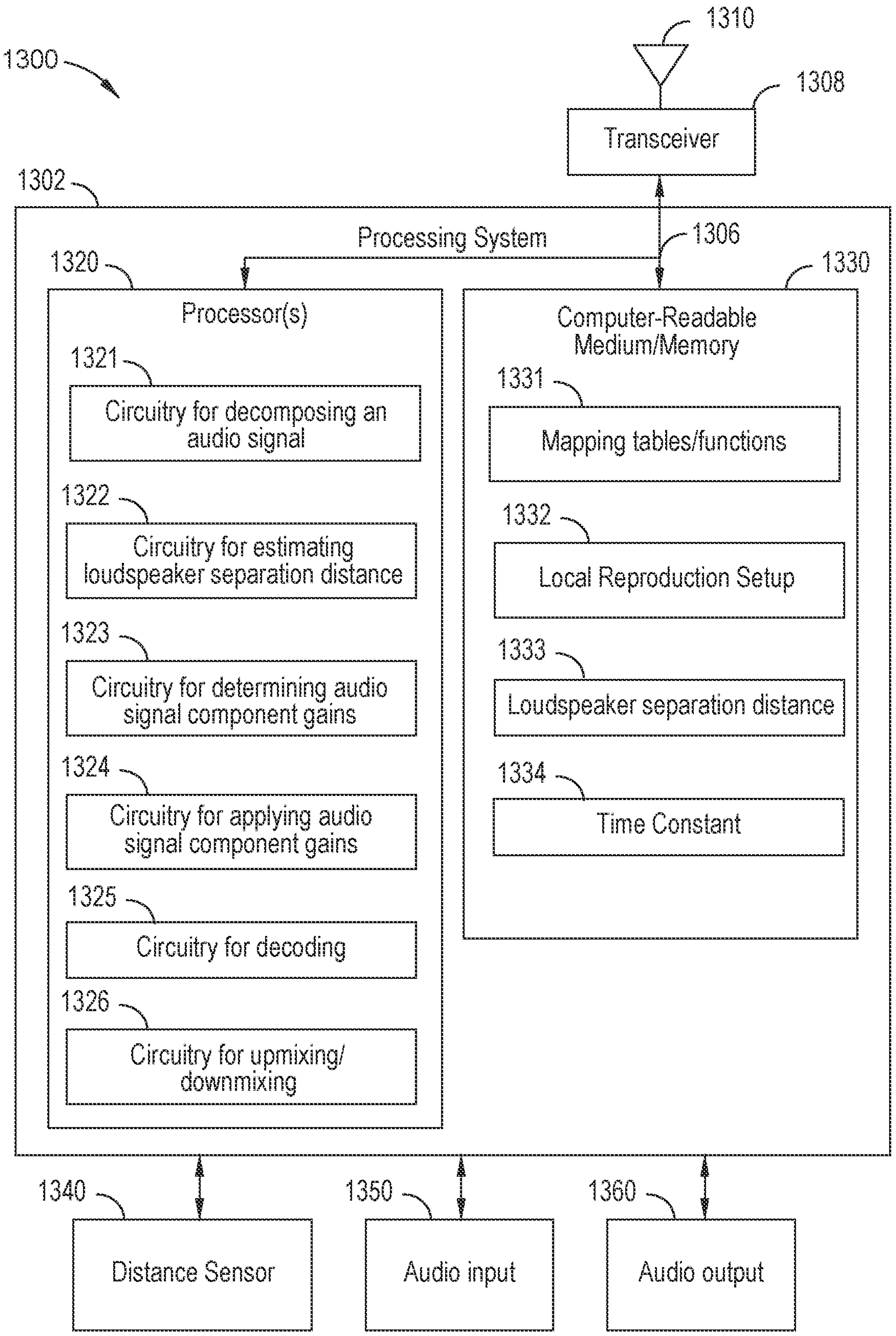
FIG. 13 depicts an example device for adaptive sound image width enhancement, according to one or more aspects.

FIG. 13 depicts aspects of an example device 1300. In some aspects, device 1300 is an input controller. In some aspects, device 1300 is a loudspeaker, such as one of the loudspeakers 115, 120, 125, 130, and 135 described above with respect to FIG. 1. While shown as a single device 1300, in some aspects, components of device 1300 may be implemented across multiple physical devices with in a multimedia system, such as multimedia system 100 described above with respect to FIG. 1, and/or within a network, such as by server 145 within network 140.

The device 1300 includes a processing system 1302 coupled to a transceiver 1308 (e.g., a transmitter and/or a receiver). The transceiver 1308 is configured to transmit and receive signals for the device 1300 via an antenna 1310, such as the various signals as described herein. The processing system 1302 may be configured to perform processing functions for the device 1300, including processing signals received and/or to be transmitted by the device 1300.

The processing system 1302 includes one or more processors 1320. The one or more processors 1320 are coupled to a computer-readable medium/memory 1330 via a bus 1306. In certain aspects, the computer-readable medium/memory 1330 is configured to store instructions (e.g., computer-executable code) that when executed by the one or more processors 1320, cause the one or more processors 1320 to perform the operations 1200 described with respect to FIG. 12, or any aspect related to it. Note that reference to a processor performing a function of device 1300 may include one or more processors performing that function of device 1300.

The one or more processors 1320 include circuitry configured to implement (e.g., execute) the aspects described herein for adaptive sound image width enhancement, including circuitry for decomposing an audio signal 1321, circuitry for estimating loudspeaker separation distance 1322, circuitry for determining audio signal component gains 1323, circuitry for applying audio signal component gains 1324, circuitry for decoding 1325, and circuitry for upmixing/downmixing 1326. Processing with circuitry 1321-1326 may cause the device 1300 to perform the operations 1200 described with respect to FIG. 12, or any aspect related to it.

In the depicted example, computer-readable medium/memory 1330 stores code (e.g., executable instructions). Processing of the code may cause the device 1300 to perform the operations 1200 described with respect to FIG. 12, or any aspect related to it. In addition, computer-readable medium/memory 1330 may store information that can be used by the processors 1320. For example, computer-readable medium/memory 1330 may store mapping tables/functions 1331, local reproduction setup information 1332, loudspeaker separation distance 1333, and a time constant 1334.

In addition, the device 1300 may include a distance sensor 1340 configured to collect raw distance data provided to the circuitry for estimating the loudspeaker separation distance 1322. The device 1300 may also include a wired audio input 1350 and a wired audio output 1360, for obtaining and outputting audio signals.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

We claim:

1. A method of adaptively correcting sound image width, the method comprising:

obtaining an audio signal, wherein the audio signal is associated with one or more audio channels, and wherein each of the one or more audio channels is associated with a position of an audio source with respect to a reference point within a local reproduction system;

decomposing the audio signal into a mid signal component, a side signal component, and an unprocessed signal component;

applying respective correction gains to each of the mid signal component, the side signal component, and the unprocessed signal component, wherein the respective correction gains are based on a physical distance between a first loudspeaker and a second loudspeaker within the local reproduction system; and rendering, after applying the respective correction gains, the mid signal component, the side signal component, and the unprocessed signal component to the first loudspeaker and the second loudspeaker.

2. The method of claim 1, wherein applying the respective correction gains comprises applying a respective correction gain of zero decibels to each of the mid signal component, the side signal component, and the unprocessed signal component when the physical distance between the first loudspeaker and the second loudspeaker is greater than a maximum threshold, smaller than a minimum threshold, or matches a target physical distance.

3. The method of claim 1, wherein applying the respective correction gains comprises:

applying a configured maximum mid signal gain value, a configured maximum side signal gain value, and a configured minimum unprocessed signal gain value when the physical distance between the first loudspeaker and the second loudspeaker is at a configured minimum distance;

applying a configured minimum mid signal gain value, a configured minimum side signal gain value, and a configured maximum unprocessed signal gain value when the physical distance between the first loudspeaker and the second loudspeaker is at a configured maximum distance; and applying a configured mid signal gain value between the minimum mid signal gain value and the maximum mid signal gain value, a configured side signal gain value between the minimum side signal gain value and the maximum side signal gain value, and a configured unprocessed signal gain value between the minimum unprocessed signal gain value and the maximum unprocessed signal gain value when the physical distance between the first loudspeaker and the second loudspeaker is between the configured minimum distance and the configured maximum distance.

4. The method of claim 3, wherein at least one of: the configured maximum mid signal gain value, the configured maximum side signal gain value, the configured minimum unprocessed signal gain value, configured minimum distance, the configured minimum mid signal gain value, the configured minimum side signal gain value, the configured maximum unprocessed signal gain value, the configured maximum distance, the configured mid signal gain value, the configured side signal gain value, or the configured unprocessed signal gain value is based on a configured mapping of correction gains to physical loudspeaker separation distances, a configured look-up table of correction gains to physical loudspeaker separation distances, a correction gain function based on physical loudspeaker separation distances, one or more boundary conditions, or a combination thereof.

5. The method of claim 1, wherein applying the respective correction gains comprises applying the respective correction gains that generate a sound image from the first loudspeaker and the second loudspeaker with the physical distance matching a target sound image associated with the first loudspeaker and the second loudspeaker at a target physical distance.

6. The method of claim 1, further comprising:

determining a difference between a total energy of the audio signal before applying the respective correction gains and the total energy of the audio signal after applying the respective correction gains; and applying a compensation gain to the audio signal based on the difference.

7. The method of claim 1, further comprising performing upmixing or downmixing on the audio signal before decomposing the audio signal or after applying the respective correction gains.

8. The method of claim 1, wherein decomposing the audio signal and applying the respective correction gains is performed independently for each of the one or more audio channels.

9. The method of claim 8, wherein the respective correction gains are the same for each of the one or more audio channels.

10. The method of claim 8, wherein the respective correction gains are different for each of the one or more audio channels.

11. The method of claim 1, wherein the respective correction gains are further based on one or more detected acoustic parameters.

12. The method of claim 1, further comprising:
collecting raw distance data between the first loudspeaker and the second loudspeaker;
applying a time constant to smooth the raw distance data; and
estimating the distance between the first loudspeaker and the second loudspeaker based on the smoothed raw distance data.

13. A system of adaptively correcting sound image width, the system comprising:
a plurality of loudspeakers at a plurality of positions within a local reproduction system; and
a processing system configured to:
obtain an audio signal, wherein the audio signal is associated with one or more audio channels, and wherein each of the one or more audio channels is associated with a position of an audio source with respect to a reference point within the local reproduction system;
decompose the audio signal into a mid signal component, a side signal component, and an unprocessed signal component;
apply respective correction gains to each of the mid signal component, the side signal component, and the unprocessed signal component, wherein the respective correction gains are based on a physical distance between a first loudspeaker and a second loudspeaker of the plurality of loudspeakers within the local reproduction system; and
render, after applying the respective correction gains, the mid signal component, the side signal component, and the unprocessed signal component to the first loudspeaker and the second loudspeaker.

14. The system of claim 13, wherein the processing system being configured to apply the respective correction gains comprises the processing system being configured to apply a respective correction gain of zero decibels to each of the mid signal component, the side signal component, and the unprocessed signal component when the physical distance between the first loudspeaker and the second loudspeaker is greater than a maximum threshold, smaller than a minimum threshold, or matches a target physical distance.

15. The system of claim 13, wherein the processing system being configured to apply the respective correction gains comprises the processing system being configured to:
apply a configured maximum mid signal gain value, a configured maximum side signal gain value, and a configured minimum unprocessed signal gain value when the physical distance between the first loudspeaker and the second loudspeaker is at a configured minimum distance;
apply a configured minimum mid signal gain value, a configured minimum side signal gain value, and a configured maximum unprocessed signal gain value when the physical distance between the first loudspeaker and the second loudspeaker is at a configured maximum distance; and
apply a configured mid signal gain value between the minimum mid signal gain value and the maximum mid signal gain value, a configured side signal gain value between the minimum side signal gain value and the maximum side signal gain value, and a configured unprocessed signal gain value between the minimum unprocessed signal gain value and the maximum unprocessed signal gain value when the physical distance between the first loudspeaker and the second loudspeaker is between the configured minimum distance and the configured maximum distance.

16. The system of claim 15, wherein at least one of: the configured maximum mid signal gain value, the configured maximum side signal gain value, the configured minimum unprocessed signal gain value, configured minimum distance, the configured minimum mid signal gain value, the configured minimum side signal gain value, the configured maximum unprocessed signal gain value, the configured maximum distance, the configured mid signal gain value, the configured side signal gain value, or the configured unprocessed signal gain value is based on a configured mapping of correction gains to physical loudspeaker separation distances, a configured look-up table of correction gains to physical loudspeaker separation distances, a correction gain function based on physical loudspeaker separation distances, one or more boundary conditions, or a combination thereof.

17. The system of claim 13, wherein the processing system being configured to apply the respective correction gains comprises the processing system being configured to apply the respective correction gains that generate a sound image from the first loudspeaker and the second loudspeaker with the physical distance matching a target sound image associated with the first loudspeaker and the seond loudspeaker at a target physical distance.

18. The system of claim 13, wherein the processing system is further configured to:
determine a difference between a total energy of the audio signal before applying the respective correction gains and the total energy of the audio signal after applying the respective correction gains; and
apply a compensation gain to the audio signal based on the difference.

19. The system of claim 13, wherein the processing system is further configured to perform upmixing or downmixing on the audio signal before decomposing the audio signal or after applying the respective correction gains.

20. A loudspeaker, comprising:
a receiver configured to obtain an audio signal, wherein the audio signal is associated with one or more audio channels, and wherein each of the one or more audio channels is associated with a position of an audio source with respect to a reference point within a local reproduction system;
adaptive sound image width enhancement circuitry configured to:
decompose the audio signal into a mid signal component, a side signal component, and an unprocessed signal component; and
apply respective correction gains to each of the mid signal component, side signal component, and the unprocessed signal component, wherein the respective correction gains are based on a physical distance between a first loudspeaker and a second loudspeaker within the local reproduction system;

a renderer configured to, after applying the respective correction gains, render the mid signal component, the side signal component, and the unprocessed signal component to the first loudspeaker and the second loudspeaker; and a transmitter configured to provide the rendered mid signal component, the rendered side signal component, and the rendered unprocessed signal component to the first loudspeaker and the second loudspeaker.

* * * * *